United States Patent
Colgan et al.

(10) Patent No.: US 12,521,423 B2
(45) Date of Patent: Jan. 13, 2026

(54) METHOD AND COMPOSITION FOR TREATING GASTROINTESTINAL INFLAMMATORY DISORDERS

(71) Applicant: THE REGENTS OF THE UNIVERSITY OF COLORADO, a body corporate, Denver, CO (US)

(72) Inventors: Sean P. Colgan, Foxfield, CO (US); Joseph Scott Lee, Denver, CO (US); Daniel J. Kao, Denver, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 1017 days.

(21) Appl. No.: 17/433,713

(22) PCT Filed: Feb. 26, 2020

(86) PCT No.: PCT/US2020/019796
§ 371 (c)(1),
(2) Date: Aug. 25, 2021

(87) PCT Pub. No.: WO2020/176564
PCT Pub. Date: Sep. 3, 2020

(65) Prior Publication Data
US 2022/0133818 A1    May 5, 2022

Related U.S. Application Data

(60) Provisional application No. 62/810,934, filed on Feb. 26, 2019.

(51) Int. Cl.
A61K 35/741    (2015.01)
A61K 35/745    (2015.01)
A61K 35/747    (2015.01)

(52) U.S. Cl.
CPC .......... *A61K 35/745* (2013.01); *A61K 35/747* (2013.01)

(58) Field of Classification Search
CPC ........................... A61K 35/745; A61K 35/747
See application file for complete search history.

(56) References Cited

U.S. PATENT DOCUMENTS 6,887,461 B1    5/2005    Warne et al.
7,704,985 B2    4/2010    Pasricha
(Continued)

FOREIGN PATENT DOCUMENTS

WO    WO 2009/064460    5/2009
WO    WO 2013/026000    2/2013
(Continued)

OTHER PUBLICATIONS

Mabley, et al.., Am J Physiol Gastrointest Liver Physiol (2002) 284:G138-G144 (Year: 2002).*
(Continued)

*Primary Examiner* — Evelyn Y Pyla
*Assistant Examiner* — Katherine R Small
(74) *Attorney, Agent, or Firm* — Sheridan Ross P.C.

(57) ABSTRACT

Methods of treating, reducing the risk of, preventing, or alleviating a symptom of inflammation or inflammatory gastrointestinal disease by administration of a modified bacterium providing purines, in particular hypoxanthine, to the mucosa of the intestine, and compositions containing modified bacteria useful in such methods.

13 Claims, 22 Drawing Sheets

(56) References Cited

U.S. PATENT DOCUMENTS

| | | |
|---|---|---|
| 8,034,601 B2 | 10/2011 | Boileau et al. |
| 8,388,935 B2 | 3/2013 | Lin et al. |
| 9,011,834 B1 | 4/2015 | McKenzie et al. |
| 9,314,489 B2 | 4/2016 | Kelly et al. |
| 2004/0038954 A1 | 2/2004 | Schreiber |
| 2009/0186384 A1 | 7/2009 | Matsuno et al. |
| 2009/0205083 A1 | 8/2009 | Gupta et al. |
| 2012/0196878 A1 | 8/2012 | Seidman et al. |
| 2012/0276143 A1 | 11/2012 | O'Mahony et al. |
| 2012/0276149 A1 | 11/2012 | Littman et al. |
| 2013/0259834 A1 | 10/2013 | Klaenhammer et al. |
| 2013/0326645 A1 | 12/2013 | Cost et al. |
| 2013/0345154 A1 | 12/2013 | Hackam |
| 2014/0045744 A1 | 2/2014 | Gordon et al. |
| 2014/0068797 A1 | 3/2014 | Doudna et al. |
| 2014/0255351 A1 | 9/2014 | Berstad et al. |
| 2014/0349405 A1 | 11/2014 | Sontheimer et al. |
| 2014/0377278 A1 | 12/2014 | Elinav et al. |
| 2015/0004130 A1 | 1/2015 | Faber et al. |
| 2015/0064138 A1 | 3/2015 | Lu et al. |
| 2015/0071957 A1 | 3/2015 | Kelly et al. |
| 2015/0132263 A1 | 5/2015 | Liu et al. |
| 2015/0190435 A1 | 7/2015 | Henn et al. |
| 2016/0000841 A1 | 1/2016 | Yamamoto et al. |
| 2016/0095316 A1 | 4/2016 | Goodman et al. |
| 2016/0120915 A1 | 5/2016 | Blaser et al. |
| 2016/0151428 A1 | 6/2016 | Bryan |
| 2016/0158294 A1 | 6/2016 | Von Maltzahn et al. |
| 2016/0199424 A1 | 7/2016 | Berry et al. |
| 2016/0206666 A1 | 7/2016 | Falb et al. |
| 2016/0206668 A1 | 7/2016 | Kort et al. |

FOREIGN PATENT DOCUMENTS

| | | |
|---|---|---|
| WO | WO 2014/182632 | 11/2014 |
| WO | WO 2015/051323 | 4/2015 |
| WO | WO 2015/069682 | 5/2015 |
| WO | WO 2016/019371 | 2/2016 |

OTHER PUBLICATIONS

Lee et al., Bioenergetics (2018) 293(16);6039-6051 (Year: 2018).*
Steidler, L., Best Practices and Research Clinical Gastroenterology (2003) 17(5): 861-876 (Year: 2003).*
Cutting, S.M., Food Microbiology (2011) 28: 214-220 (Year: 2011).*
Jia et al., "Gut microbiota: a potential new territory for drug targeting," Nature Reviews: Drug Discovery, vol. 7, Feb. 2008, pp. 123-129.
Lee et al., "Hypoxanthine is a checkpoint stress metabolite in colonic epithelial energy modulation and barrier function," Journal of Biological Chemistry, vol. 293, No. 16, Feb. 27, 2018, pp. 6039-6051.
Ling et al., "Research Article: Clostridium butyricum Combined with Bifidobacterium infantis Probiotic Mixture Restores Fecal Microbiota and Attenuates Systemic Inflammation in Mice with Antibiotic-Associated Diarrhea," BioMed Research International, vol. 2015, No. 582048, Feb. 2, 2015, 10 pages.
Nyerges et al., "Research Article: A highly precise and portable genome engineering method allows comparison of mutational effects across bacterial species," Proceedings of the National Academy of Sciences of the United States of America, vol. 113, No. 9, Feb. 16, 2016, pp. 2502-2507.
Synnestvedt et al., "Ecto-5'-nucleotidase (CD73) regulation by hypoxia-inducible factor-1 mediates permeability changes in intestinal epithelia," The Journal of Clinical Investigation, vol. 110, No. 7, Oct. 1, 2002, pp. 993-1002.
International Preliminary Report on Patentability for International (PCT) Application No. PCT/US2020/019796, dated Sep. 10, 2021, 12 pages.
International Search Report and Written Opinion prepared by the United States Patent Office on May 6, 2020, for International Application No. PCT/US2020/019796.

* cited by examiner

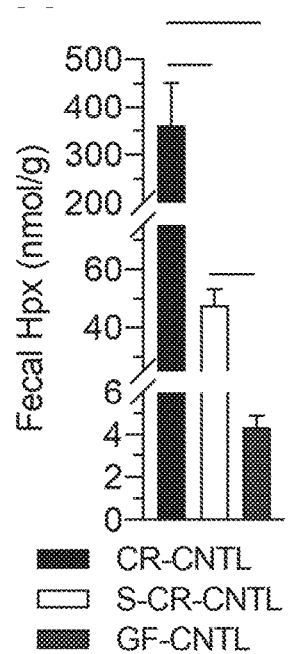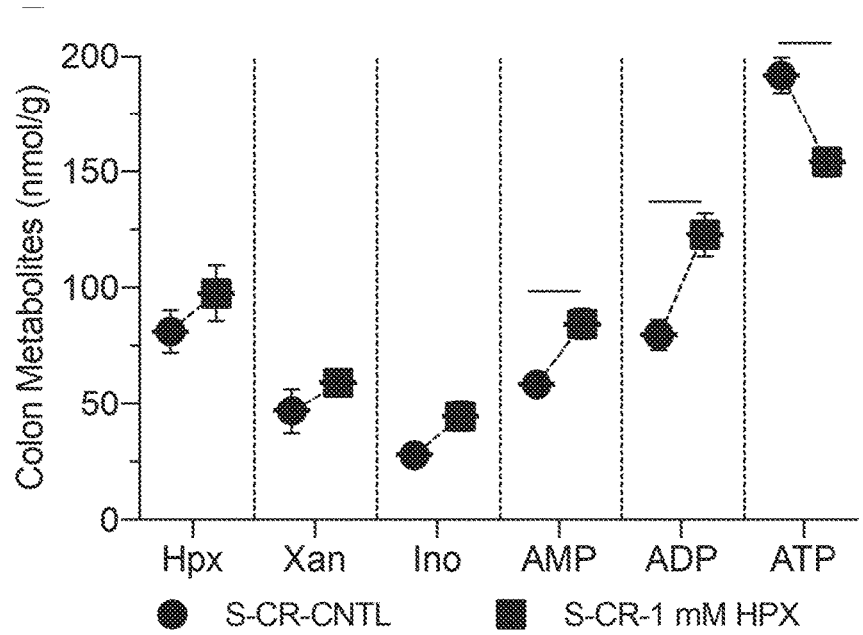
FIG. 10A  FIG. 10B
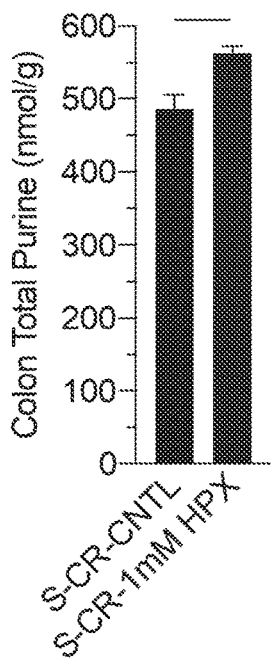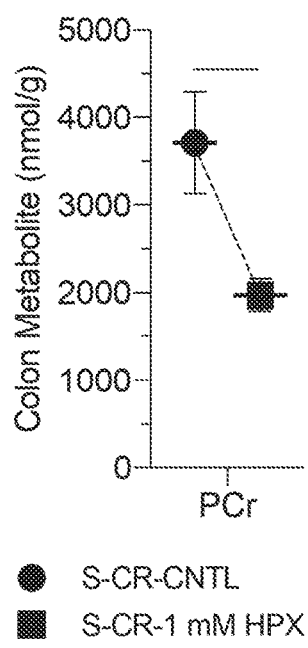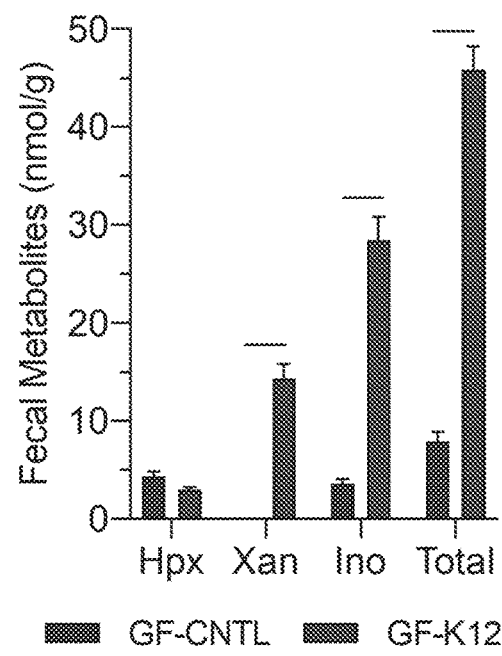
FIG. 10C  FIG. 10D  FIG. 10E

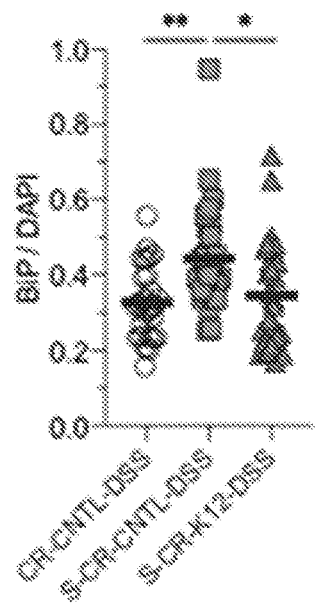 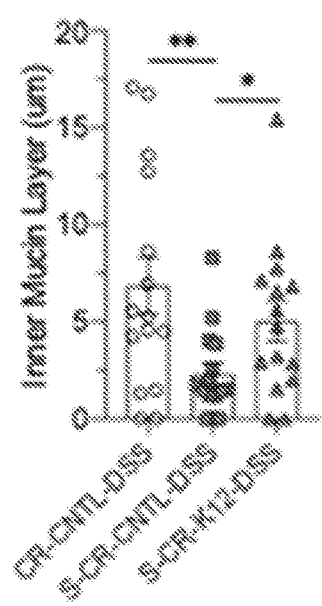 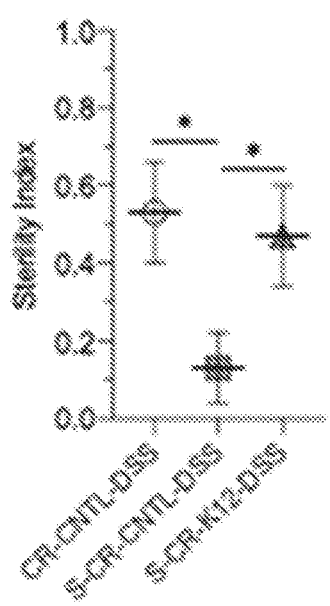
FIG. 13A   FIG. 13D   FIG. 13E
FIG. 13B

METHOD AND COMPOSITION FOR TREATING GASTROINTESTINAL INFLAMMATORY DISORDERS

CROSS-REFERENCE TO RELATED APPLICATIONS

This application is a national stage application under 35 U.S.C. 371 and claims the benefit of PCT Application No. PCT/US2020/019796 having an international filing date of 26 Feb. 2020, which designated the United States, and which PCT application claims the benefit of priority under 35 U.S.C. § 119 (e) to U.S. Provisional Patent Application No. 62/810,934, filed 26 Feb. 2019, the entire disclosures of each of which are incorporated herein by reference.

STATEMENT OF FEDERALLY SPONSORED RESEARCH

This invention was made with government support under grant number DK095491 awarded by the National Institutes of Health. The government has certain rights in the invention.

FIELD OF THE INVENTION

Methods and compositions for treating and preventing gastrointestinal inflammatory disorders by modifying a subject's microbiome, and in particular to a method and composition designed to produce purines in a subject's microbiome to reduce inflammation and promote mucosal homeostasis, thereby preventing, delaying the onset, and reducing the incidence of gastrointestinal inflammatory disorders.

BACKGROUND OF THE INVENTION

Inflammatory bowel diseases (IBD) are characterized by chronic relapsing inflammation that damages the intestinal mucosa. Dysregulation of intestinal epithelial cell (IEC) barrier in IBD and dysbiosis of the intestinal microbiota coincides with profound shifts in metabolic energy stores, especially in the colon, which exists in an energetically-vulnerable state of physiologic hypoxia.

The intestinal microbiome encompasses trillions of non-pathogenic microorganisms of bacterial, Archaeal, viral, and fungal origins, and augments the host immune system to prevent the colonization of pathogenic microorganisms and regulates many essential metabolic functions by extracting otherwise inaccessible energy and nutrients from food that cannot be fully digested by host cells. Microbial metabolites such as fermentation products or narrow-spectrum antibiotic proteins produced by bacteria have roles in these effects in addition to the activity of the microbes themselves. This suggests that manipulating the microbiome can aid in the treatment of these afflictions.

Compelling evidence for the link between microbiota and disease pathogenesis has been found in germ-free animal models for human autoimmune diseases. In these models, exposure and colonization by microbes from the external environment is required for disease initiation and progression. Indeed, many human diseases and disorders have been associated with gastrointestinal inflammation or disturbances within healthy commensal gut microbial populations.

Inflammatory bowel diseases (IBD) such as Crohn's disease (CD) and ulcerative colitis (UC), as well as irritable bowel syndrome (IBS), Celiac disease, and antibiotic-associated diarrhea (AAD) have been linked to microbial dysbiosis in the gastrointestinal tract. Antibiotic-associated diarrheas are clear-cut examples of the relationship between gut microbe disruptions and human and animal health. For example, *Clostridium difficile* infection (CDI) is one such disorder, wherein *C. difficile* bacteria overtake the colonic environment, leading to debilitating and sometimes deadly colitis. CDI has been associated with drastic changes in the diversity and community structure of the microbiome. Metabolic diseases such as obesity and diabetes and even disorders of the central nervous system (CNS) are additional examples of disease states that have been linked to disruptions in the gastrointestinal microbiota.

There are successful examples of manipulating the gut microbiome to counteract disease. For example, changes in diet are linked to changes in the microbial communities, suggesting the microbiome can be manipulated directly for therapeutic purposes. Another method of manipulation is fecal microbiota transplantation (FMT), in which stool from a healthy donor is administered to an unhealthy subject. FMT represents a more direct manipulation of the microbiome, and has resulted in weight loss and effective treatment of recurrent CDI. But concerns remain for FMT regarding donor infection transmission, patient acceptance, and long-term effects within the recipient's microbiome. Isolated colonies of microorganisms that confer benefits to the host could have a similar effect in the treatment of disease while eliminating the perceived risks associated with transferring fecal material between humans.

Probiotics are often encapsulated dormant microbial populations, which when administered are able to attach and populate the target anatomy in order to confer beneficial effects. Despite the hundreds of commercially available probiotic products, few formulations extend beyond members of the Bifidobacteria and *Lactobacillus* genera, and most products do not involve a targeted delivery system, sufficient colony forming units (CFUs), or prebiotics, all of which may be needed to ensure the survival and growth of the microbes in the gut.

Thus, there is a need for improved and effective probiotic compositions and methods to effectively ameliorate disorders related to gastrointestinal inflammation.

SUMMARY

Areas of a healthy GI mucosa withstand $pO_2$ levels approaching anoxia, existing in a homeostatic state termed 'physiologic hypoxia.' The high-energy demands of the mucosa and fundamental need of barrier function for intestinal homeostasis have driven the evolution of mechanisms to cope with this energetically-depleting, low oxygen state. One such mechanism is a preference for purine salvage in lieu of de novo purine synthesis. As such, the present inventors have discovered a strong capacity for intestinal epithelial cells (IECs) to salvage the purine hypoxanthine (Hpx) for ATP production, with a concomitant improvement in IEC barrier function under hypoxia. The inventors then identified the gut microbiota as a key source of intestinal purines. Extensions of the inventors' studies revealed that germ-free (GF) mice monocolonized with purine-producing bacteria have significantly increased colon tissue Hpx. Further studies showed that the monocolonized mice enriched in purine generation were protected from dextran sulfate sodium (DSS)-induced colitis. HPLC analyses of colon tissue extracts revealed that the monocolonized mice utilize microbial-derived purines to maintain tissue ATP during DSS colitis, with histological and immunofluorescent imaging of the colonic tissues implicating the promotion of goblet cell secretion and enterocyte production of intestinal alkaline phosphatase as protective mechanisms. Taken together, these studies demonstrate microbiota-derived purine metabolites are important components of mucosal homeostasis, and represent a therapeutic strategy to promote inflammatory resolution and a return to intestinal homeostasis in inflammatory bowel diseases.

The goblet cells of the colonic mucosa are responsible for isolating the host immune system from potentially pathogenic microorganisms through producing and secreting large amounts of mucin proteins. Dysfunctional mucin secretion renders the normally microbial impermeable inner mucin layer penetrable, ultimately allowing bacterial translocation across the epithelium to incite inflammatory responses. Loss of mucin barrier integrity and the resulting activation of the host immune system is implicated in the pathogenesis of inflammatory bowel disease. Mucus barrier formation and maintenance is quite demanding of nucleotides. At baseline the intestinal mucosa is short lived, undergoing turnover every 3-5 days, with proliferation required all the more to regenerate the epithelial cell population during insult. Moreover, secretory cells such as goblet cells consume and require considerable ATP supply to fuel the endoplasmic reticulum for mucin protein generation and secretion. The inventors have demonstrated that large quantities of purines are made and released by the gut microbiota and that such microbiota-derived purines (MDP) are available to the intestinal mucosa. Through a series of experiments in which MDP production was depleted by antibiotic treatment, and purines reconstituted by supplementation and colonization with purine-producing bacteria, the contribution of MDP to colonic proliferation and energetics during DSS-induced colitis was delineated. Through H PLC-based metabolite analyses, exogenously supplied purines showed incorporation into the murine colonic purine metabolite pool, were utilized for nucleotide genesis, and promoted energy balance. Immunofluorescent and metabolite analyses revealed that DSS-insulted colon tissue lacking MDP substrates were proliferatively stunted, with notable energetic and endoplasmic reticulum (ER) stress, to the detriment of mucus barrier integrity. Upon purine reconstitution, the energetic state of the tissue was improved and ER stress alleviated, with concomitant reclamation of proliferative capacity and mucus barrier sterility. Together, this work establishes MDP as a critical substrate for colonic tissue metabolism that facilitates mucosal homeostasis and inflammatory resolution.

The present invention therefore represents a paradigm shift in the current therapeutic strategies of targeting and preventing disorders and diseases related to inflammation of the gastrointestinal mucosa. Aspects of the present invention provide methods and compositions that treat these disorders or diseases. In these methods, purines, such as hypoxanthine, xanthine, inosine, and adenosine (including AMP, ADP, and ATP), are administered to a subject via bacteria modified to produce purines to reduce or prevent inflammation of the gastrointestinal mucosa, and promote wound healing and tissue regeneration following damage.

One aspect of the present invention is directed to the provision to subjects in need thereof bacteria that have been modified to produce effective amounts of purines to reduce inflammation and promote wound healing and mucosal integrity.

In these methods and compositions, the genome of one or more bacterial species is genetically modified to produce a genetically-modified organism having elevated levels of purines. These genetically modified organisms (preferably bacteria of the same species as presently reside in the subject's gut microbiome) may be administered to a subject to provide purines to the subject in a manner that does not require injections or the taking of traditional pharmaceutical formulations containing purines. In such manner, the production of purines by such bacteria inside the subject's gut provides a more natural and sustained way for purines to be provided to those in need of treatment of gastrointestinal inflammatory disorders. In these methods and compositions, the purines provided or produced by the genetically modified bacteria may comprise or consist of one or more of hypoxanthine, xanthine, inosine, and adenine (as adenosine, including AMP, ADP, and ATP). Hypoxanthine, in this instance, is but one of many purines provided by the gastrointestinal microbiome of a subject that can be amended, modified, enhanced and/or changed to treat gastrointestinal inflammatory disorders and maintain or restore health to a subject.

These methods may include mucosally administering to the subject an effective amount of a bacteria that has been genetically modified to produce one or more purines. The genetically modified bacteria may be selected from the group consisting of *Streptococcus, Actinomyces, Veillonella, Fusobacterium, Porphromonas, Prevotella, Treponema, Neisseria, Haemophilus, Eubacteria, Lactobacterium, Capnocytophaga, Eikenella, Leptotrichia, Peptostreptococcus, Staphylococcus, Streptococcus thermophilus* and *Propionibacterium*.

The administration of such purines via a subject's gut microbiome positively affects the energy metabolism and cellular functions within the gastrointestinal mucosa, thus treating or reducing the incidence of gastrointestinal inflammation in the subject from what it otherwise would be if such administration is not performed.

Gastrointestinal inflammatory disorders that may be treated by such administration include but are not limited to: inflammatory bowel disease (IBD) (Crohn's disease and ulcerative colitis), irritable bowel syndrome (IBS), antibiotic-associated diarrheas such as recurrent *Clostridium difficile* infection, and variants of Celiac disease.

One will appreciate that this Summary is not intended to be all encompassing and that the scope of the invention nor its various embodiments, let alone the most important ones, are necessarily encompassed by the above description. One of skill in the art will appreciate that the entire disclosure, as well as the incorporated references, figures, etc. will provide a basis for the scope of the present invention as it may be claimed now and in future applications. While embodiments of the invention have been illustrated and described, it is not intended that these embodiments illustrate and describe all possible forms of the invention. Rather, the words used in this specification are words of description rather than limitation, and it is understood that various changes may be made without departing from the spirit and scope of the invention.

BRIEF DESCRIPTION OF THE FIGURES

In FIG. 3A, the line indicates wound edge and dark area indicates original wound area in FIG. 3B. Data presented in FIG. 3B as mean±SD; TER, transepithelial resistance; *** indicates p<0.001.

FIG. 7A shows the hypoxanthine (Hpx), xanthine (Xan), inosine (Ino), and total purine (TP) levels in fecal extracts from germ-free mice uncolonized (CNTL) and monocolonized with the K12M, genetically-modified E. coli (K12M). FIG. 7B shows total purine content from colon extracts from germ-free mice uncolonized (CNTL) and monocolonized with the K12M, genetically-modified E. coli (K12M), and conventionally-raised (CR) mice. FIG. 7C shows the hypoxanthine (Hpx), phosphocreatine (PCr), adenosine monophosphate (AMP), adenosine triphosphate (ATP), adenosine diphosphate (ADP), and total available energy (TAE; PCr+ATP+0.5*ADP). Not shown but also observed are colonic increases in xanthine, inosine, uric acid, and AMP. In these figures, *** indicates p<0.001.

FIG. 8A shows hematoxylin and eosin (H&E) staining. FIG. 8B and 8C show immunofluorescent analyses for intestinal trefoil factor (ITF) and intestinal alkaline phosphatase (ALPI), respectively.

FIGS. 9A and 9B show weight and survival curves of GF-CNTL-DSS and GF-K12M-DSS mice. FIG. 9C shows purine and energy metabolite analyses of GF-CNTL-DSS and GF-K12M-DSS mice. FIG. 9D shows hematoxylin and eosin (H&E) staining and immunofluorescent analyses of intestinal trefoil factor (ITF) and intestinal alkaline phosphatase (ALPI) in GF-K12M-DSS mice. TP, total purine; PCr, phosphocreatine; ATP, adenosine triphosphate; ADP, adenosine diphosphate; TAE, total available energy (PCr+ATP+0.5*ADP).

FIGS. 10A, 10B, 10C, 10D, 10E, 10F, 10G, 10H, 10I and 10J show metabolite concentrations obtained from murine fecal extracts. FIG. 10A shows concentrations of hypoxanthine (Hpx) in fecal extracts in conventionally-raised mice (CR-CNTL), streptomycin treated conventionally-raised mice (S-CR-CNTL), and germ-free mice (GF-CNTL). FIGS. 10B, 10C, and 10D show the results of supplementation of hypoxanthine (1 mM) via enema at 5 and 8 hours before sacrifice on individual colonic adenine nucleotides (FIG. 10B), the total colonic purine pool (FIG. 10C) and phosphocreatine (FIG. 10D). FIG. 10E shows metabolite concentrations of individual colonic adenine nucleotides obtained from germ-free control mice (GF-CNTL) and germ-free mice colonized with E. coli K12 (GF-K12). FIGS. 10F and 10G show the results of GF-CNTL and GF-K12 mice subjected to DSS-induced colitis on weight (FIG. 10F) and survival (FIG. 10G). FIGS. 10H through 10J compared GF-CNTL and GF-K12 mice with mice subjected to DSS-induced colitis (GF-K12-DSS) on parameters of individual colonic adenine nucleotides (FIG. 10H), the total colonic purine pool (FIG. 10I) and phosphocreatine (FIG. 10J).

FIGS. 11A and 11B compare weight change over time (FIG. 11A), percent-change in colon length (FIG. 11B) for the DSS-induced colitis mice (CR-CNTL-DSS, S-CR-CNTL-DSS and S-CR-K12-DSS). FIG. 11C compares total colonic purine levels between the control mice and the mice subjected to DSS-induced colitis. FIG. 11D compares concentrations of individual colonic nucleotides and phosphocreatine between the control mice and the mice subjected to DSS-induced colitis.

FIGS. 12A, 12B, 12C, and 12D compared colon tissues from conventionally-raised mice, streptomycin treated conventionally-raised mice, and streptomycin treated conventionally-raised mice colonized with E. coli K12 subjected to DSS-induced colitis (CR-CNTL-DSS, S-CR-CNTL-DSS and S-CR-K12-DSS). FIG. 12A compares hematoxylin and eosin (H&E) stains of colon tissues from the three mice groups. FIG. 12B compares the adenylate energy charge (AEC) index between the three mice groups. FIG. 12C shows the difference in tissue proliferative capacity using the Ki67 marker between the three mice groups. FIG. 12D compares immunofluorescent analyses of tissues from the three mice groups.

FIGS. 13A, 13B, 13C, 13D, 13E, and 13F demonstrate the effect of microbiota-derived purines (MDP) on colonic mucin production and secretion. FIG. 13A compares endoplasmic reticulum (ER) function through the binding immunoglobulin protein (BiP) marker of ER stress from conventionally-raised mice, streptomycin treated conventionally-raised mice, and streptomycin treated conventionally-raised mice colonized with E. coli K12 subjected to DSS-induced colitis (CR-CNTL-DSS, S-CR-CNTL-DSS and S-CR-K12-DSS). FIG. 13B shows tissue images of BiP expression in the three mice groups. FIG. 13C shows tissue samples from the three mice groups stained with alcian blue to show mucin production. FIG. 13D compares inner mucin layer length among the three mice groups. FIG. 13E compares sterility index, as described in Example 12, among the three mice groups. FIG. 13F compares tissue images of the mucin layer among the three mice groups.

FIG. 14A shows the change in body weight in the three groups over time. FIG. 14B shows the change in colon length among the three groups. FIG. 14C compares colon tissue AEC among the three groups. FIG. 14D compares hematoxylin and eosin (H&E) stains of colon tissues from the three mice groups.

FIG. 15A compares tissue proliferative capacity using the Ki67 marker among the three mice groups. FIG. 15B compares immunofluorescent analyses of tissues from the three mice groups. FIG. 15C compares ER stress through the binding immunoglobulin protein (BiP) marker among the three groups. FIG. 15D compares tissue images of the mucin layer among the three mice groups.

FIG. 16A shows thecal cell volumes from tissue samples of the three mice groups stained with alcian blue to show mucin production. FIG. 16B compares tissue images of the mucin layer among the three mice groups. FIG. 16C compares changes in the inner mucin layer length among the three mice groups. FIG. 16D compares sterility index, as described in Example 12, among the three mice groups.

DETAILED DESCRIPTION

Figure 1:
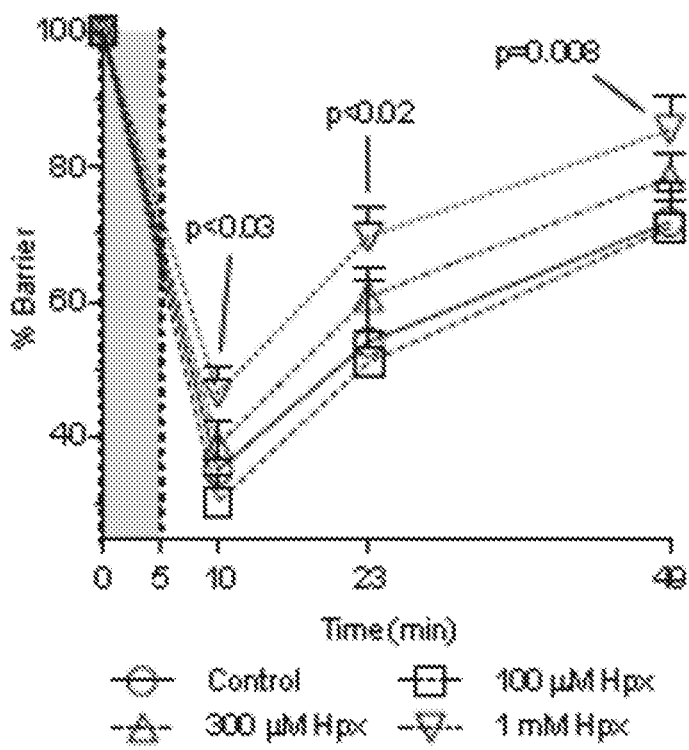
FIG. 1 shows barrier responses in IECs to hypoxanthine supplementation during a calcium switch experiment (n=6).

The forgotten organ, the human microbiome, comprises a community of microorganisms that colonizes various sites of the human body. Through coevolution of bacteria, archaea and fungi with the human host over thousands of years, a complex host-microbiome relationship emerged in which many functions, including metabolism and immune responses, became codependent. This coupling becomes evident when disruption in the microbiome composition, termed dysbiosis, is mirrored by the development of pathologies in the host. Among the most serious consequences of dysbiosis, is the development of gastrointestinal inflammatory disorders.

Intestinal wound healing and mucin barrier restoration requires substantial nucleotide genesis to replicate DNA for proliferation and ATP regeneration to promote an energy balance conducive for cytoskeletal and endoplasmic reticulum (ER) function, while supporting an anabolic metabolism. The adenine nucleotides (AMP, ADP, and ATP) are of exceptional significance to eukaryotic cells. These nucleotides are connected to every sequence in a living cell, in many cases through direct dependency on the stored energy provided by ATP to drive chemical reactions. Recent in vitro work revealed that purine supplementation significantly improved intestinal epithelial cell (IEC) wound healing and barrier reformation capabilities. Cultured IECs exhibit a strong capacity to improve energy balance through salvaging the purine hypoxanthine (Hpx) for ATP biosynthesis, which in turn supported barrier function and wound healing capabilities. In extension of that work, we herein identify Hpx as a product of the intestinal microbiota. Through a series of in vivo experiments involving microbiota-derived purine depletion, and reconstitution by way of hypoxanthine supplementation and colonization with purine-producing bacteria, the inventors have surprisingly found the essential contribution of microbiota-derived purine (MDP) to colonic epithelial proliferation, energy balance, and mucin barrier integrity during wound healing.

Purine salvage initiates through Hpx ribosylation with phosphoribosyl pyrophosphate (PRPP) by the action of hypoxanthine-guanine phosphoribosyltransferase (HGPRT) to form inosine monophosphate (IMP), which is either used by the guanylate metabolite pathway for guanosine triphosphate (GTP) biosynthesis or aminated to eventually form ATP. The requirement of GTP for conversion of IMP into AMP functions as a metabolic check on guanylate metabolite levels, shunting purine flux towards GTP biosynthesis if necessary. In this it may be assumed that the adenine nucleotide levels function as a marker for all purine nucleotides. Xan is analogously salvaged for GTP production, but may also be used to form ATP. The austere milieu of physiological hypoxia in which the colonic mucosa resides is energetically challenging at baseline. Maintaining an energy balance conducive to wound healing in the exacerbated hypoxia and damaging inflammatory environment is all the more problematic, presenting a substantial obstacle to the essential but nutrient and energy consuming processes necessary to regenerate the epithelium and restore barrier. Salvage of exogenously supplied purines provides a mechanism for the intestinal mucosa to efficiently biosynthesize nucleotides and promote energy balance.

The methods of this disclosure involve the expression/production by microbes of an subject's microbiome of one or more purine(s) to reduce inflammation and promote healthy intestinal mucosa to treat gastrointestinal inflammatory disorders.

"Gastrointestinal inflammatory disorders" are a group of chronic disorders that cause inflammation and/or ulceration in the mucous membrane. These disorders include, for example, inflammatory bowel disease (e.g., Crohn's disease, ulcerative colitis, indeterminate colitis and infectious colitis), mucositis (e.g., oral mucositis, gastrointestinal mucositis, nasal mucositis and proctitis), necrotizing enterocolitis and esophagitis. Inflammatory Bowel Disease (IBD) is used interchangeably herein to refer to diseases of the bowel that cause inflammation and/or ulceration and includes without limitation Crohn's disease and ulcerative colitis. Crohn's disease (CD) and ulcerative colitis (UC) are chronic inflammatory bowel diseases of unknown etiology. Crohn's disease, unlike ulcerative colitis, can affect any part of the bowel. The most prominent feature of Crohn's disease is the granular, reddish-purple edematous thickening of the bowel wall. With the development of inflammation, these granulomas often lose their circumscribed borders and integrate with the surrounding tissue. Diarrhea and obstruction of the bowel are the predominant clinical features. As with ulcerative colitis, the course of Crohn's disease may be continuous or relapsing, mild or severe, but unlike ulcerative colitis, Crohn's disease is not curable by resection of the involved segment of bowel. Most patients with Crohn's disease require surgery at some point, but subsequent relapse is common and continuous medical treatment is usual.

Crohn's disease may involve any part of the alimentary tract from the mouth to the anus, although typically it appears in the ileocolic, small-intestinal or colonic-anorectal regions. Histopathologically, the disease manifests by discontinuous granulomatomas, crypt abscesses, fissures and aphthous ulcers. The inflammatory infiltrate is mixed, consisting of lymphocytes (both T and B cells), plasma cells, macrophages, and neutrophils. There is a disproportionate increase in IgM- and IgG-secreting plasma cells, macrophages and neutrophils.

Anti-inflammatory drugs sulfasalazine and 5-aminosalicylic acid (5-ASA) are used for treating mildly active colonic Crohn's disease and are commonly prescribed in an attempt to maintain remission of the disease. Metronidazole and ciprofloxacin are similar in efficacy to sulfasalazine and are particularly prescribed for treating perianal disease. In more severe cases, corticosteroids are prescribed to treat active exacerbations and can sometimes maintain remission. Azathioprine and 6-mercaptopurine have also been used in patients who require chronic administration of corticosteroids. It has been suggested that these drugs may play a role in the long-term prophylaxis. Unfortunately, there can be a very long delay (up to six months) before onset of action in some patients. Antidiarrheal drugs can also provide symptomatic relief in some patients. Nutritional therapy or elemental diet can improve the nutritional status of patients and induce symptomatic improvement of acute disease, but it does not induce sustained clinical remissions. Antibiotics are used in treating secondary small bowel bacterial overgrowth and in treatment of pyogenic complications.

Ulcerative colitis (UC) afflicts the large intestine. The course of the disease may be continuous or relapsing, mild or severe. The earliest lesion is an inflammatory infiltration with abscess formation at the base of the crypts of Lieberkuhn. Coalescence of these distended and ruptured crypts tends to separate the overlying mucosa from its blood supply, leading to ulceration. Symptoms of the disease include cramping, lower abdominal pain, rectal bleeding, and frequent, loose discharges consisting mainly of blood, pus, and mucus with scanty fecal particles. A total colectomy may be required for acute, severe or chronic, unremitting ulcerative colitis. The clinical features of UC are highly variable, and the onset may be insidious or abrupt, and may include diarrhea, tenesmus and relapsing rectal bleeding. With fulminant involvement of the entire colon, toxic megacolon, a life-threatening emergency, may occur. Extraintestinal manifestations include arthritis, pyoderma gangrenoum, uveitis, and erythema nodosum.

Treatment for UC includes sulfasalazine and related salicylate-containing drugs for mild cases and corticosteroid drugs in severe cases. Topical administration of either salicylates or corticosteroids is sometimes effective, particularly when the disease is limited to the distal bowel and is associated with decreased side effects compared with systemic use. Supportive measures such as administration of iron and antidiarrheal agents are sometimes indicated. Azathioprine, 6-mercaptopurine and methotrexate are sometimes also prescribed for use in refractory corticosteroid-dependent cases.

Monoclonal antibodies targeting tumor necrosis factor alpha (TNF-α), such as infliximab (a chimeric antibody) and adalimumab (a fully human antibody), are also used in the management of CD. Infliximab has also shown efficacy and has been approved for use in UC. However, approximately 10%-20% of patients with CD are primary non-responders to anti TNF therapy, and about 20%-30% of CD patients lose response over time. Other adverse events associated with anti TNF therapies include elevated rates of bacterial infection, including tuberculosis, and, more rarely, lymphoma and demyelination. In addition, most patients do not achieve sustained steroid-free remission and mucosal healing, clinical outcomes that correlate with true disease modification. Therefore, there is a need for therapy in IBD that is optimized for chronic use, including improved safety profiles with sustained remission, particularly steroid-free remission and prevention of long-term complications in a greater proportion of patients, including those patients who either never respond to an anti-TNF therapeutic agent or lose response over time.

Similar to the role of inflammation in slowing or preventing the healing of wounds, inflammatory bowel disease (IBD), specifically ulcerative colitis, is characterized by intestinal inflammation, and oxidative stress. Therefore, administration of the genetically modified microbes of this disclosure to provide elevated levels of purines to the intestinal mucosa can be used to treat inflammatory bowel diseases by reducing inflammation and promoting regeneration of damaged intestinal mucosa.

A "subject" as used in this disclosure is typically a human. In certain embodiments, a subject is a non-human mammal. Exemplary non-human mammals include laboratory, domestic, pet, sport, and stock animals, e.g., mice, cats, dogs, horses, and cows. Typically, the subject is eligible for treatment, e.g., treatment of a gastrointestinal inflammatory disorder. As used herein, the term "patient" refers to any single subject for which treatment is desired. The patient herein is typically a human. A subject can be considered to be in need of treatment.

The use of the terms "a," "an," "the," and similar referents in the context of describing the presently claimed invention (especially in the context of the claims) are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated, and each separate value is incorporated into the specification as if it were individually recited herein.

Use of the term "about" is intended to describe values either above or below the stated value in a range of approximately +/−10%. The preceding ranges are intended to be made clear by context, and no further limitation is implied. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

An "effective amount" of a composition of this disclosure is an amount sufficient to carry out a specifically stated purpose. An "effective amount" may be determined empirically and in a routine manner, in relation to the stated purpose. The term "therapeutically effective amount" refers to an amount of a microbial composition, to "treat" a gastrointestinal disease or disorder in a subject.

As used herein, "promoting" or "promote" means reducing the time for the intestinal mucosa to repair or recover from injuries or inflammation to the mucosa of the colon by increasing the extent of tissue repair or recovery. The compositions of this disclosure may promote repair or recovery by reducing or suppressing inflammation in the epithelial or mucosal tissues.

As used herein, "suppressing", "suppress", or "suppression" means stopping the inflammation from occurring, worsening, persisting, lasting, or recurring.

"Reducing", "reduce", or "reduction" means decreasing the severity, frequency, or length of the inflammation.

"Treating" or "treatment" or "alleviation" refers to both therapeutic treatment and prophylactic or preventative measures, wherein the object is to prevent or slow down (lessen)

the targeted pathologic condition or disorder. Those in need of treatment include those already with the disorder as well as those prone to have the disorder or those in whom the disorder is to be prevented. A subject or mammal is successfully "treated" for an inflammatory disease or disorder if, after receiving a therapeutic amount of a composition of this disclosure, according to the methods of this disclosure, the subject shows observable and/or measurable reduction in, or absence of, one or more symptoms of the inflammatory gastrointestinal disease or disorder or increased rates of healing or repair. Reduction of these signs or symptoms may also be felt by the patient.

Therapeutic Compositions

Gastrointestinal inflammatory disorders may result from an imbalance or disturbance within individual members or communities of microbial populations within the human gastrointestinal tract. Elimination of such imbalances or disruptions may accompany restoration of healthy gastrointestinal microbiota, which in turn leads to improvements in gastrointestinal inflammatory disorders. Correction of microbial dysbiosis is feasible with the administration of the beneficial microbiota of this disclosure, which when administered to a subject provide health benefits and treatment. However, currently available probiotics in the market contain limited selections of microbes and do not include targeted delivery systems.

The present inventors have demonstrated that gastrointestinal inflammatory disorders can be treated using a composition comprising genetically modified microorganisms to provide purines, such as hypoxanthine, xanthine, inosine, and adenine (as adenosine, including AMP, ADP, and ATP), in the gastrointestinal tract of the subject.

The human large intestine is one of the most diversely colonized and metabolically active organs in the human body. Up to 1000 different species of bacteria reside in the colon with microbial populations comprising approximately a trillion cfu/g of contents. The colonic environment is favorable for bacterial growth due to its slow transit time, readily available nutrients, and favorable pH.

The microbial compositions of this disclosure contain commensal human gut microbiota that have been genetically engineered to produce purines. Human gut-associated microbiota are dominated by four main phyla: Firmicutes, Bacteroidetes, Actinobacteria and Proteobacteria and one or more members of these phyla are preferably included in the microbial compositions of this disclosure. Other phyla that are less represented and may also be included in the disclosed synbiotic compositions include the Fusobacteria, Euryarchaeota, and Verrucomicrobia phyla.

The most abundant genera from the Bacteroidetes phylum are *Bacteroides* and *Prevotella* species, which represent 80% of all Bacteroidetes in fecal samples. Additional members of Bacteroidetes include, but are not limited to *Bacteroides vulgatus*, *Barnesiella* spp., and *Odoribacter* spp.

Representative members of Firmicutes include but are not limited to *Anaerotruncus colihominis*, *Butyrivibrio crossotus*, *Clostridium* spp., *Caprococcos eutactus*, *Faecalibacterium prausnitzii*, *Lactobacillus* spp., *Pseudoflavonifractor* spp., *Roseburia* spp., *Ruminococcus* spp., and *Veillonella* spp. Representative members of the Actinobacteria phylum include but are not limited to *Bifidobacterium* spp., *B. longum*, and *Collinsella aerofaciens*. *Methanobrevibacter smithii* is a representative member of Euryarchaeota. *Fusobacterium* spp is a representative member of Fusobacteria.

*Akkermansia muciniphila* is a representative member of Verrucomicrobia.

In an exemplary embodiment, the microbial composition of this disclosure includes one or more of the following: *Achromobacter* spp., *Actinomyces* spp., *Aeromonas* spp., *Acidaminococcus fermentans*, *Acinetobacter calcoaceticus*, *Akkermansia muciniphila*, *Alcaligenes faecalis*, *Anaerobiospirillum* spp., *Anaerotruncus colihominis*, *Bacillus* spp., *Bacteroides* spp. including but not limited to *Bacteroides vulgatus*, *Bacteroides melaninogenicus* and *Bacteroides fragilis*, *Barnesiella* spp., *Bifidobacterium* spp. including but not limited to *Bifidobacterium longum*, *Butyrivibrio crossotus*, *Butyriviberio fibrosolvens*, *Campylobacter* spp., *Caprococcos eutactus*, *Clostridium* spp. including but not limited to *Clostridium difficile* and *Clostridium sordellii*, *Collinsella aerofaciens*, *Enterococcus* spp., *Eubacterium* spp., *Faecalibacterium prausnitzii*, *Flavobacterium* spp., *Fusobacterium* spp., *Lactobacillus* spp., *Methanobrevibacter smithii*, *Morganella morganii*, Mycobacteria spp., *Mycoplasma* spp., *Odoribacter* spp., *Peptococcus* spp., *Peptostreptococcus* spp., *Prevotella* spp, *Propionibacterium* spp., *Providencia* spp., *Pseudoflavonifractor* spp., *Pseudomonas aeruginosa*, *Roseburia* spp., *Ruminococcus* spp. including but not limited to *Ruminococcus bromii*, *Sarcina* spp., *Staphylococcus aureus*, *Streptococcus viridans*, *Yersinia enterocolitica*, *Veillonella* spp., *Vibrio* spp., and combinations thereof.

In an exemplary embodiment, the microbial composition of this disclosure includes one or more species belonging to one or more genera or species selected from the group consisting of *Bifidobacterium*, *Bacteroides*, *Tannerella*, *Parabacteroides*, *Bacillus*, *Lactobacillus*, *Anaerostipes*, *Anaerostipes*, *Blautia*, *Coprococcus*, *Dorea*, *Clostridium* XI, *Collinsella*, and *Paraprevotella*. In still another embodiment, the synbiotic composition includes *Clostridium* sp., *Lactobacillus* sp., *Lactobacillus murinus*, *Mucispirillum schaedleri*, *Eubacterium plexicaudatum*, Firmicutes bacterium, *Clostridium* sp. and *Parabacteroides* sp. In another embodiment, the synbiotic composition includes *Paraprevotella clara*, *Bifidobacterium longum*, *Collinsella aerofaciens*, *Coprococcus comes*, *Dorea longicatena*, *Bacteroides eggerthii* str., and *Bacteroides vulgates*.

In an exemplary embodiment, the microbial composition of this disclosure includes viable non-pathogenic purine-producing microbes that facilitate microbial and host gastrointestinal mucosal health. Representative purines that may be produced by these microbial compositions include hypoxanthine, xanthine, inosine, and adenine (as adenosine, including AMP, ADP, and ATP).

The number of microorganisms per dosage unit of these compostions is typically 1 million to 1 trillion colony forming units (CFU), depending upon the formulation.

The compositions of this disclosure may be formulated to be released in specific locations of the gastrointestinal tract. For example, the compositions can be targeted to the oral cavity, stomach, small intestine, ileum, or colon. To reach the colon and produce/release the purine(s), a dosage form must be formulated taking into account various obstacles introduced by the gastrointestinal tract. Successful delivery of the purines to the colon requires protection of the microbes from degradation or release in the stomach and then release of purines in the colon. The desired properties of colon targeted drug delivery systems can be achieved by using some polymers either alone or in a combination.

Materials for intestinal targeting which can be used for surrounding or encapsulating the microbes may include encapsulating materials such as a compound that is insoluble in the gastrointestinal fluid at a pH of below 5 and which is soluble in the intestinal fluid at a pH at or above 5. Thus, this material dissolves in a pH-dependent manner. The encapsulating material has a pH threshold which is the pH below which it is insoluble and at or above which it is soluble. The pH of the surrounding medium triggers the solution of the encapsulating material. Thus, none (or essentially none) of the encapsulating material dissolves below the pH threshold. Once the pH of the surrounding medium reaches (or exceeds) the pH threshold, the encapsulating material becomes soluble. As used herein, "insoluble" materials require more than 10,000 ml of solvent (surrounding medium) to dissolve 1 gram of material at a given pH. "Soluble" materials will dissolve in an amount of 1 g of the material in less than 10,000 ml, preferably less than 5,000 ml, more preferably less than 1,000 ml, even more preferably less than 100 ml or 10 ml of solvent at a given pH. "Surrounding medium" means the medium in the gastrointestinal tract, such as the gastric fluid or intestinal fluid. Alternatively, the surrounding medium may be an in vitro equivalent of the medium in the gastrointestinal tract.

The normal pH of gastric fluid is usually in the range of 1 to 3. The materials in the compositions of this disclosure that may be used to target delivery of the purine-producing microbes of this disclosure may be insoluble below pH 5 and soluble at or above pH 5. The material therefore is usually insoluble in gastric fluid. Such material may be referred to as an "enteric" material. The pH of intestinal fluid gradually increases to about 7 to 8 along the small intestine. The material for intestinal targeting therefore becomes soluble in the terminal ileum/colon and allows release of the purine-producing microbes from the composition. The material preferably has a pH threshold of 6.5, more preferably of 7.

Examples of suitable materials for intestinal targeting and in particular for the preparation of a coating surrounding the purine producing microbial composition are gelatin, acrylate polymers, cellulose polymers and polyvinyl-based polymers, chitosan, its derivatives or other polymers. Examples of suitable cellulose polymers include cellulose acetate phthalate, cellulose acetate trimellitate and hydroxypropylmethyl cellulose acetate succinate. Examples of suitable polyvinyl-based polymers include polyvinylacetate phthalate.

The material for intestinal targeting can be a co-polymer of a (meth)acrylic acid and a (meth)acrylic acid $C_{1-4}$ alkyl ester, for example, a copolymer of methacrylic acid and methacrylic acid methyl ester. Suitable examples of such copolymers are usually anionic and not sustained release polymethacrylates. The ratio of carboxylic acid groups to methylester groups in these co-polymers determines the pH at which the copolymer is soluble. The acid:ester ratio may be from about 2:1 to about 1:3, e.g. about 1:1 or, about 1:2. The molecular weight of such anionic copolymers is usually from about 120,000 to 150,000, preferably about 135,000.

Anionic poly(methacrylic acid/methyl methacrylate) co-polymers include Eudragit™ L (pH threshold about 6.0), Eudragit™ S (pH threshold about 7) and Eudragit™ FS (pH threshold about 7). Eudragit™ L 100-55 which is a copolymer of methacrylic acid and ethylacetate and which has a pH threshold of about 5.5 is also suitable. The Eudragit™ copolymers can be obtained from Evonik.

In one embodiment, the polymer coating contains linear polysaccharides. Linear polysaccharides remain intact in stomach and small intestine but the bacteria of human colon degrades them and thus make them potentially useful in colon targeted drug delivery systems. Exemplary linear polysaccharides include, but are not limited to, guar gum, pectin, chondroitin sulfate, dextran, chitosan, cyclodextrin, inulin, amylose, locust bean gum, and combinations thereof.

Colon-targeting materials for use in the purine producing microbial compositions of this disclosure may comprise a compound which is susceptible to attack by colonic bacteria, such as polysaccharides. Suitable polysaccharides are for example starch, amylose, amylopectine, chitosan, chondroitine sulfate, cyclodextrine, dextrane, pullulan, carrageenan, scleroglucan, chitin, curdulan and levan.

These colon-targeting compositions may also include a mucoadhesive agent or polymer. A "mucoadhesive" is a polymer that attaches to the mucin layer of mucosal tissue. The mucosal layer lines a number of regions of the body including the gastrointestinal tract, the urogenital tract, the airways, the ear, nose and eye. Suitable polymers that can be used to form mucoadhesive compositions include soluble and insoluble, non-biodegradable, and biodegradable polymers. Representative polymers that can be used to make mucoadhesive compositions include, but are not limited to hydrogels, thermoplastics, homopolymers, copolymers or blends, and natural or synthetic polymers.

Exemplary hydrophilic polymers include but are not limited to methylcellulose, hydroxyethyl, cellulose, hydroxy propyl methyl cellulose, sodium carboxy methyl cellulose, carbomers, chitosan, plant gums, and combinations thereof.

Exemplary hydrogels include but are not limited to poly (acrylic acid co acrylamide) copolymers, carrageenan, sodium alginate, guar gum, modified guar gum, or combinations thereof.

Exemplary thermoplastic polymers include, but are not limited to non-erodible neutral polystyrene and semi crystalline bioerodible polymers, which generate the carboxylic acid groups as they degrade, e.g. polyanhydrides and polylactic acid. Various synthetic polymers used in mucoadhesive formulations include polyvinyl alcohol, polyamides, polycarbonates, polyalkylene glycols, polyvinyl ethers, esters and halides, polymethacrylic acid, polymethylmethacrylic acid, methylcellulose, hydroxypropyl cellulose, hydroxypropyl methylcellulose and sodium carboxymethylcellulose.

Various biocompatible polymers used in mucoadhesive formulations include cellulose-based polymers, ethylene glycol polymers and its copolymers, oxyethylene polymers, polyvinyl alcohol, polyvinyl acetate and esters of hyaluronic acid.

Various biodegradable polymers used in mucoadhesive formulations are poly(lactides), poly(glycolides), poly(lactide-co-glycolides), polycaprolactones, and polyalkyl cyanoacrylates. Polyorthoesters, polyphosphoesters, polyanhydrides, polyphosphazenes are the recent additions to the polymers.

Compositions of this disclosure comprising purine producing microbes may include media that can maintain or sustain viability of the microbes as well as any or all of the colon targeting materials described above.

Therapeutic Methods

The disclosed purine producing microbial compositions are useful in the treatment of gastrointestinal inflammatory disorders.

Thus, this disclosure provides methods of treating a gastrointestinal inflammatory disorder by administering to a subject in need thereof an effective amount of one or more purine producing microbial compositions of this disclosure. Representative gastrointestinal disorders that may be treated include, but are not limited to, inflammatory bowel disease, Crohn's disease, ulcerative colitis, irritable bowel syndrome, Celiac disease, small intestinal bacterial overgrowth (SIBO), antibiotic-associated diarrhea (AAD), and *Clostridium difficile* related diarrhea.

The purine producing microbial compositions of this disclosure may be administered orally or rectally on a chronic or intermittent basis and are suitable for treating, reducing the risk of, preventing, or alleviating a symptom of inflammatory bowel diseases, including ulcerative colitis, indeterminate colitis, and Crohn's disease. In these methods, the response to administration of the purine producing microbial compositions of this disclosure may include one or more of clinical response, mucosal healing, and remission.

To bring the purine producing microbial compositions into contact with the inflamed intestinal mucosa, these compositions may be formulated for oral or rectal administration. The purine producing microbial compositions of this disclosure can be administered by any suitable means, including topical, intralesional, oral, and/or rectal administration. Preferably these compositions are administered orally and/or rectally. The administration of a therapeutic formulation comprising the purine producing microbial composition of this disclosure may be useful in treating, preventing, or alleviating inflammatory bowel diseases. The typical dose will range from 1-4 dosage units up to 4 times per day for up to 4 weeks.

In these therapeutic methods, the clinician administering treatment will be able to determine an appropriate dose for the individual subject for weight-based or flat dosing (i.e., a particular amount of the composition that is administered to every patient regardless of weight). For the prevention or treatment of disease, the appropriate dosage of the compositions and any second therapeutic or other compound administered in combination with the purine producing microbial compositions will depend on the disease state being treated, e.g., the gastrointestinal inflammatory disorder to be treated (IBD, UC, CD) the severity and course of the disease, whether the composition or combination is administered for preventive or therapeutic purposes, previous therapy, the patient's clinical history and response to the microbial composition and the discretion of the clinician. In these methods, the composition is suitably administered to the patient at one time or more typically over a series of treatments. For example, the purine producing microbial compositions may be administered once every week, or once every two weeks, or once every four weeks, or once every six weeks, or once every eight weeks for a period of one month (4 weeks), or two months, three months, or six months, or 12 months, or 18 months, or 24 months, or chronically for the lifetime of the patient. Alternatively or additionally, these compositions may be self-administered by the patient. For repeated administrations over several days or longer, depending on the condition, the treatment is sustained until a desired suppression of disease symptoms occurs. However, other dosage regimens may be useful. Typically, the subject will administer a composition of this disclosure (alone or in combination with a second compound) until a dosage(s) is reached that provides the required biological effect. The progress of the therapy of the invention is easily monitored by conventional techniques and assays.

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

The foregoing written specification and following examples are considered to be sufficient to enable one skilled in the art to practice the invention. Various modifications of the invention in addition to those shown and described herein will become apparent to those skilled in the art from the foregoing description and following examples and fall within the scope of the appended claims. The disclosures of all citations in the specification are expressly incorporated herein by reference.

To comply with written description and enablement requirements, all references cited herein, including but not limited to published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material. Incorporated herein by this reference are the following US patent publications: 20160000841 to Yamamoto, et al.; 20160095316 to Goodman et al.; 20160158294 to Von Maltzahn; 20150071957 to Kelly et al.; 20160151428 to Bryann et al.; 20160199424 to Berry et al.; 20160120915 to Blaser et. al.; 20140349405 to Sontheimer; 20140377278 to Elinav; 20140045744 to Gordon; 20130259834 to Klaenhammer; 20120276143 to O'Mahony; 20150064138 to Lu; 20090205083 to Gupta et al.; 20150132263 to Liu; 20140068797 to Doudna; 20140255351 to Berstad et al.; 20150190435 to Henn et al.; 20150004130 to Faber et. al; 20160206666 to Falb; 20160206668 to Kort et. al; 20160199424 to Berry et al.; 20130326645 to Cost et al.; 20120276149 to Littman; and the following U.S. Pat. No. 9,314,489 to Kelly et. al.; U.S. Pat. No. 8,034,601 to Boileau et al.; U.S. Pat. No. 9,011,834 to McKenzie; and the following International (PCT) patent applications: PCT/US2014/036849 and PCT/US2012/051363 to Bryann; and PCT/US2014/063994 to Asesvelt, et. al.

EXAMPLES

Example 1

Hypoxanthine Supplementation Improves Barrier Function and Healing Capabilities

Adenylate and energy metabolite shifts were observed in a model of epithelial barrier disruption—namely the "calcium switch" model (Synnestvedt, et al. (2002) The Journal of clinical investigation 110:993). This model utilizes transient divalent cation chelation to disrupt epithelial tight junctions in fully confluent cells.

Briefly, polarized, high-resistant (>1,500 Ω·cm2) T84 monolayers on 0.33 cm$^2$ (non-metabolomic) or 5 cm$^2$ (metabolomics) transwell inserts (Costar, 0.4 μm) were equilibrated for 1 h in HBSS in the case of non-metabolomic analyses and approx. 20 h in the case of metabolomic analyses. All experiments were performed at 37° C. and transepithelial resistance monitored using a voltohmeter (World Precision Instruments EVOM). Extracellular $Ca^{2+}$ was chelated via washing and incubation with $Ca^{2+}$-free HBSS supplemented with 2 mM EDTA for 5 min, after which the samples were washed into HBSS with normal calcium (1.8 mM). This results in a >90% loss of measureable barrier that can be restored over time.

Significant changes were observed in the creatine pool, with PCr increasing from approx. 275 to 500 μM (p=0.04)

and Cr decreasing from approx. 1100 to 950 µM (p<0.03) at points along the experiment. To our surprise, this analysis identified an inverse correlation between Hpx and barrier, with Hpx spiking from approx. 1 to 3.5 µM (p<0.004) at the barrier nadir. This showed that epithelia have the capacity to rapidly regulate adenylate metabolite pools, with Hpx serving as a marker of such metabolite flux, while all other metabolites responses were insignificant or undetectable. To extend this observation, T84 cells were supplemented with Hpx (range 0.1-1 mM, 20 h) and a calcium switch assay performed. Such pre-exposure to Hpx typically increased intracellular Hpx levels up to 100-fold. Functionally, Hpx pre-loading proved protective of cellular barrier and promoted barrier reformation in a dose-responsive manner (FIG. 1). Cells supplemented with 300 µM and 1 mM Hpx (p<0.03) exhibited improved barrier throughout the course of the experiment, demonstrating that Hpx promotes epithelial barrier restitution following disruption.

Example 2

Allopurinol Attenuates Barrier Development

Allopurinol (Allo) is a structural analog of hypoxanthine commonly used to treat gout. The drug is metabolized into oxipurinol by xanthine oxidase (XO), which in turn inhibits XO and decreases uric acid. Allopurinol was employed as a competitive substrate/inhibitor for hypoxanthine-guanine phosphoribosyl transferase (HGPRT) to assess the contribution of Hpx salvage to the barrier formation process using the calcium switch assay and transepithelial resistance measurements described above.

Figure 2:
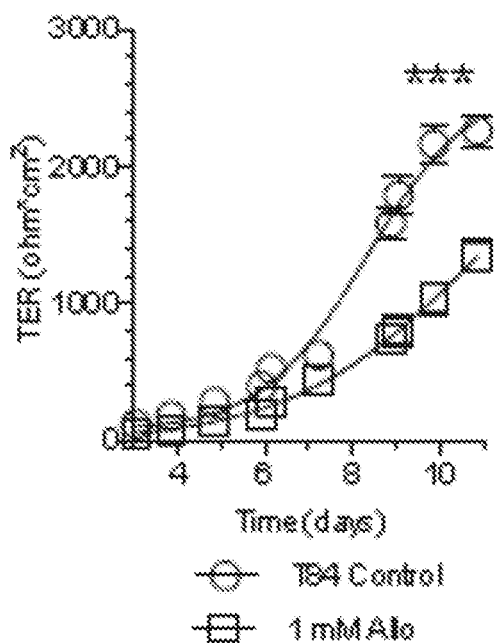
FIG. 2 shows the results of transepithelial resistance measurements of IEC cell barrier development in control and 1 mM allopurinol-treated cells (n=6).

Supplementation with Allo (1 mM) significantly attenuated T84 cell barrier formation (p<0.001; FIG. 2). In subconfluent (restituting) T84 cells treated with Allo (20 h), small increases in Xan and Ino were observed, but to our surprise Hpx decreased from approx. 400 to 250 nM (p<0.05) while Ado increased from trace/undetectable levels to approx. 400 nM. An approx. 20 to 27 µM (p=0.03) PCr increase accounted for a corresponding increase in TAE. Adenine, IMP, and UA were observed at undetectable to trace levels. These data demonstate that allopurinol attenuates barrier development by inhibiting adenylate flux through the hypoxanthine salvage pathway, further supporting the role of hypoxanthine supplementation in promoting T84 cell barrier formation, rate, and strength.

Example 3

Hypoxanthine Significantly Increases Epithelial Wound Closure Rate

Figure 3A:
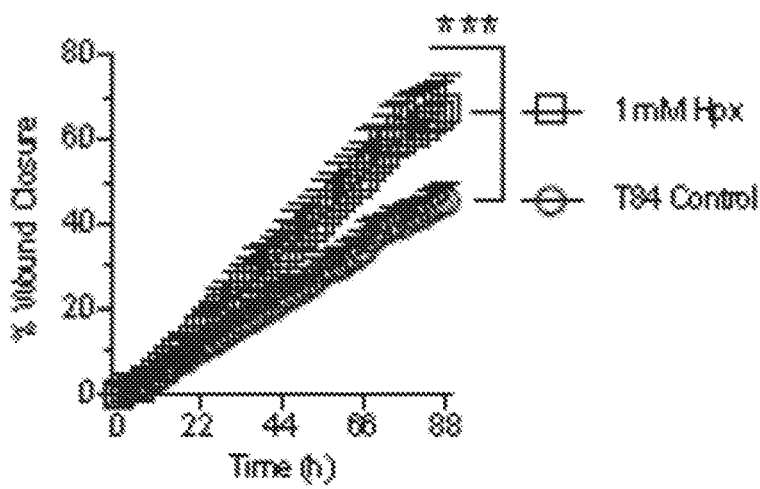
FIGS. 3A and 3B show the results of scratch wound assay to evaluate hypoxanthine supplementation on T84 cell wound healing rate. Wound healing responses were observed in response to 1 mM hypoxanthine supplementation (n=5).
Figure 3B:
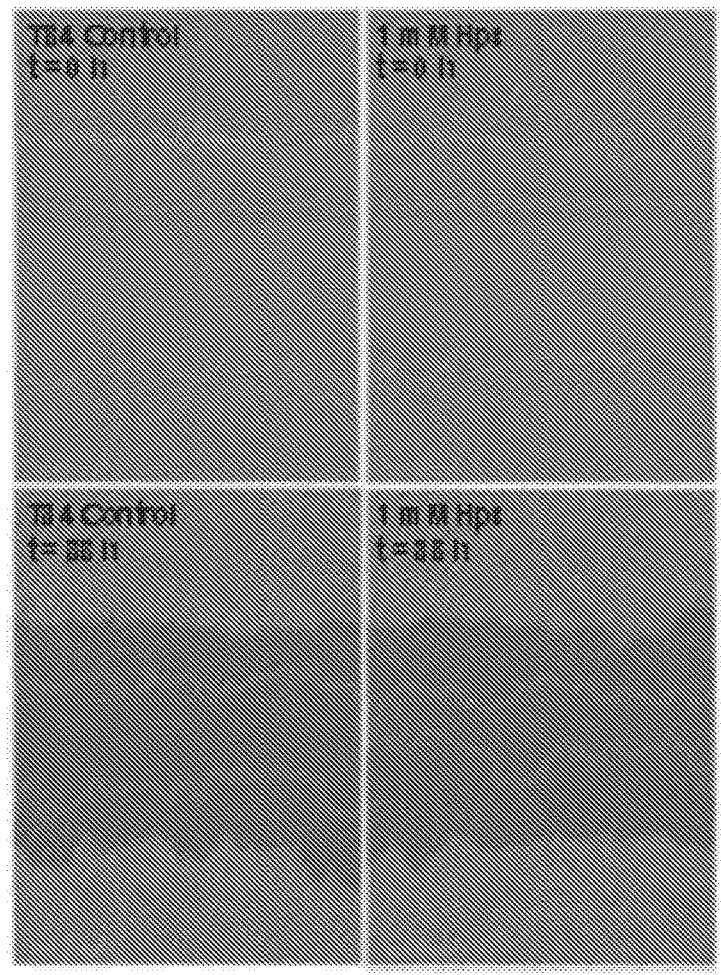

We also employed a scratch wound assay to assess the influence of Hpx supplementation on cellular restitution. T84 cells were plated at 35,000 cells per well on a 96-well ImageLock tissue culture plate (Essen Bioscience Inc.) and incubated in standard conditions until a confluent cell monolayer formed (~24 h). Precise and reproducible wounds were made in all wells with a WoundMaker (Essen Bioscience Inc.). After wounding, media was aspirated from each well, and each well was gently washed with PBS before 100 µL of control media or media containing 1 mM hypoxanthine was added. Initial images were taken immediately after wounding at 10× using the IncuCyte live-cell imaging (Essen Bioscience Inc.), and then every 2 h over the course of 88 h in culture. Relative wound closure (%) was quantified for every image using the relative wound density metric, a measure of cell density in the wound area relative to the cell density outside of the wound area. Hypoxanthine significantly increased epithelial wound closure rate following scratching (approx. 1.5-fold, p<0.001; FIGS. 3A and 3B), revealing a capacity to improve cellular migratory ability.

Example 4

Hypoxanthine Promotes Barrier Function and Energetics Under Hypoxia

Figure 4A:
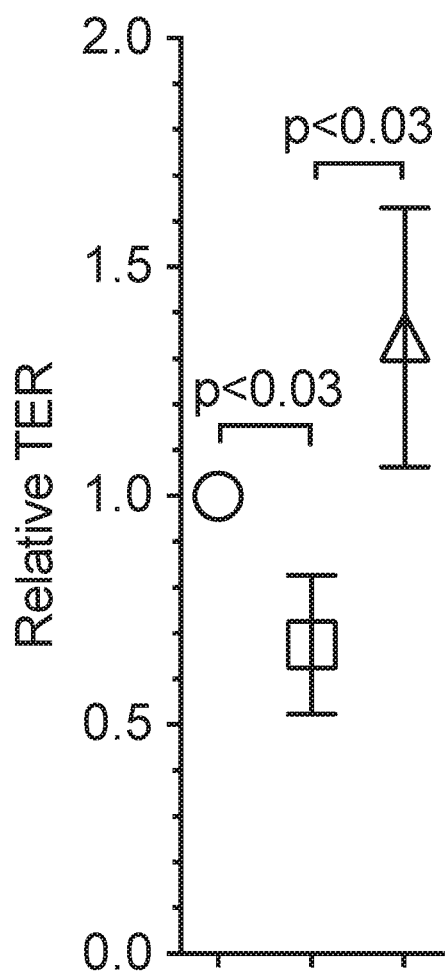
FIGS. 4A and 4B show the results of barrier resistance and metabolite responses of hypoxic cells to hypoxanthine in relative transepithelial resistance measurements of normoxic control, hypoxic control (1% O2), and hypoxanthine (1 mM) supplemented (hypoxic, 1% O2) T84 cells over 40 hours (n=3), and total available energy analyses by HPLC. Total available energy=phosphocreatine+ATP+0.5*ADP; Nx, normoxia; Hx, hypoxia; TER, transepithelial resistance.
Figure 4B:
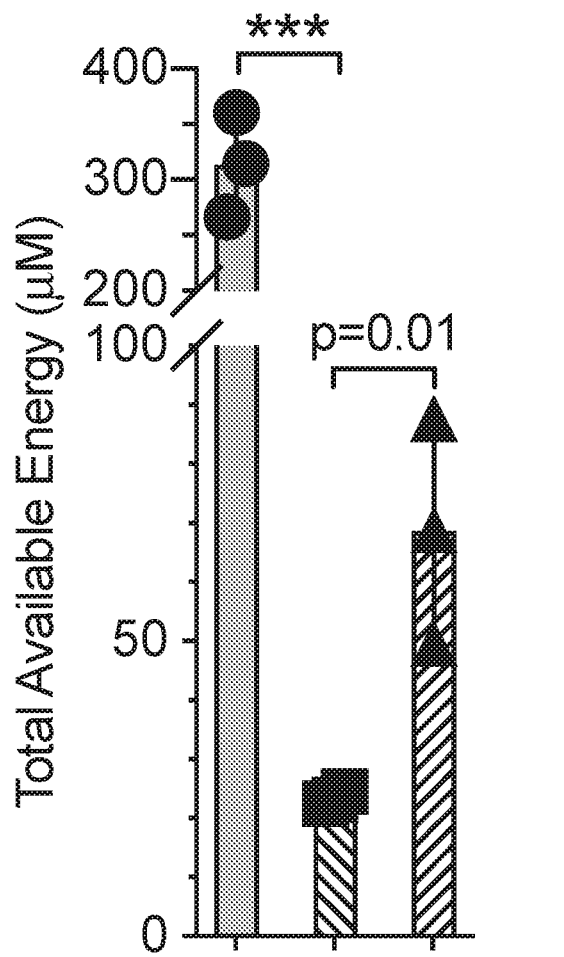

To examine the impact of Hpx supplementation on epithelial function during physiologically-relevant metabolic stress, T84 cells were exposed to hypoxia (1% $O_2$, 40 h) in the presence and absence of 1 mM Hpx, and barrier and adenylate metabolites monitored. Hypoxia elicited approx. 32% decrease (p<0.03) in measured barrier in the control cells (FIG. 4A). As shown in FIG. 4A, the hypoxia-induced fall in TER was not only prevented by Hpx supplementation, but perhaps even over-compensated to increase overall barrier resistance above control conditions by approx. 1.3-fold, demonstrating that supplementation with hypoxanthine improves barrier function in T84 epithelial cells subjected to hypoxia. Furthermore, the total available energy (TAE, phosphocreatine+ATP+0.5*ADP) was detrimentally impacted by hypoxia, but showed significant recovery with hypoxanthine supplementation (FIG. 4B).

Example 5

Hypoxanthine is a Product of the Murine Microbiota

Figure 5:
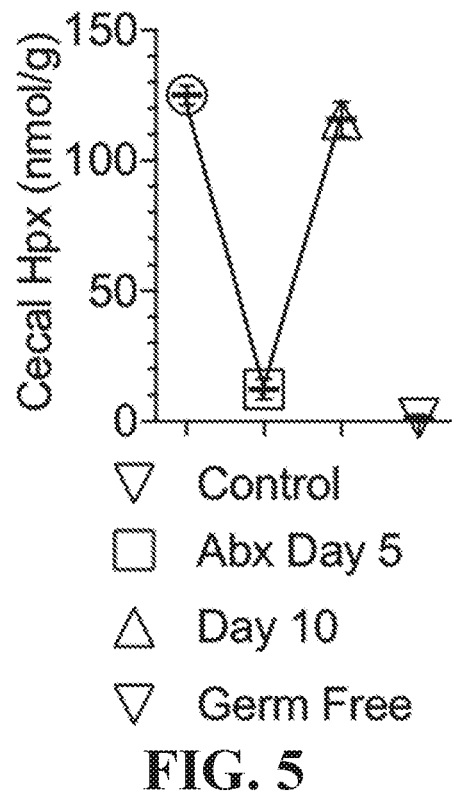
FIG. 5 demonstrates that hypoxanthine is a product of the murine microbiota. HPLC analyses of murine cecal content extracts before (Control) and after a 5-day antibiotic treatment (Abx Day 5). Also shown here are levels after removing antibiotics for 5 days (Day 10). Additionally, germ-free mice show no hypoxanthine in cecal content extracts.

Hypoxanthine content in mouse cecal samples was measured by HPLC analyses of murine cecal content extracts (Control) and showed that mouse fecal samples contain high levels of hypoxanthine (FIG. 5). After administration of a 5-day broad spectrum antibiotic treatment (FIG. 5, Abx Day 5), cecal hypoxanthine content is substantially diminished and the cecal hypoxanthine levels return after removing antibiotics for 5 days (FIG. 5, Day 10). Additionally, germ free mice show no hypoxanthine in cecal content extracts.

Figure 6:
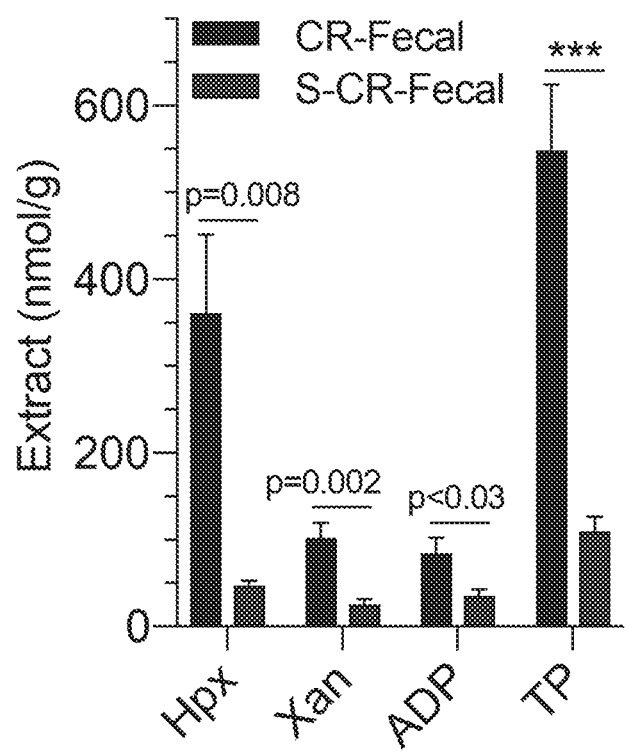
FIG. 6 shows the results of HPLC analyses of purine content in murine fecal extracts 1 day after streptomycin treatment (n=5). CR, conventionally-raised mice; S-CR, streptomycin-treated, conventionally-raised mice.

Similarly, HPLC analyses of murine fecal extracts showed that microbial hypoxanthine production, as well as xanthine (Xan) and ADP, are selectively attenuated by streptomycin treatment. FIG. 6 shows fecal purine levels before (CR-Fecal) and 1 day after streptomycin treatment, showing that administration of a single antibiotic (streptomycin) results in a nearly complete loss of measurable fecal hypoxanthine. These results demonstrate that purines are a product of the murine microbiota, especially hypoxanthine.

Example 6

Genetically Engineered *E. coli* Elevate Colonic Hypoxanthine, Improve Energetics, and Promote Intestinal Homeostatic Functions To evaluate the production and delivery of hypoxanthine in the colon by genetically modified microbes, *E. coli* were genetically modified to overproduce purines. Three genes, purR (b1658), hpt (b0125), and gpt (b0238), were mutated in the BW25113 parent strain (*E coli* K12 derivative strain). The mutations were introduced using co-selection multiplex automated genome engineering (CoS-MAGE) the efficiency of which was increased using the helper plasmid pORT- MAGE (Nyerges, et al., Proceeding of the National Academy of Sciences, Mar. 1, 2016, 113(9):2502-07). These three genes were disrupted by introducing single nucleotide substitutions in the coding sequences of each gene to create premature stop codons, resulting in dramatically truncated and nonfunctional gene products. The mutations were confirmed by PCR and agarose gel electrophoresis.

E. coli was grown to saturation in streptomycin-containing (100 ug/mL) LB. An aliquot (500 µL) was centrifuged at 3000×g to pellet the bacteria, and the supernatant removed. The bacteria was resuspended in twice the amount of PBS (1000 µL) and the germ-free mice monocolonized by oral gavage (100 uL).

Figure 7A:
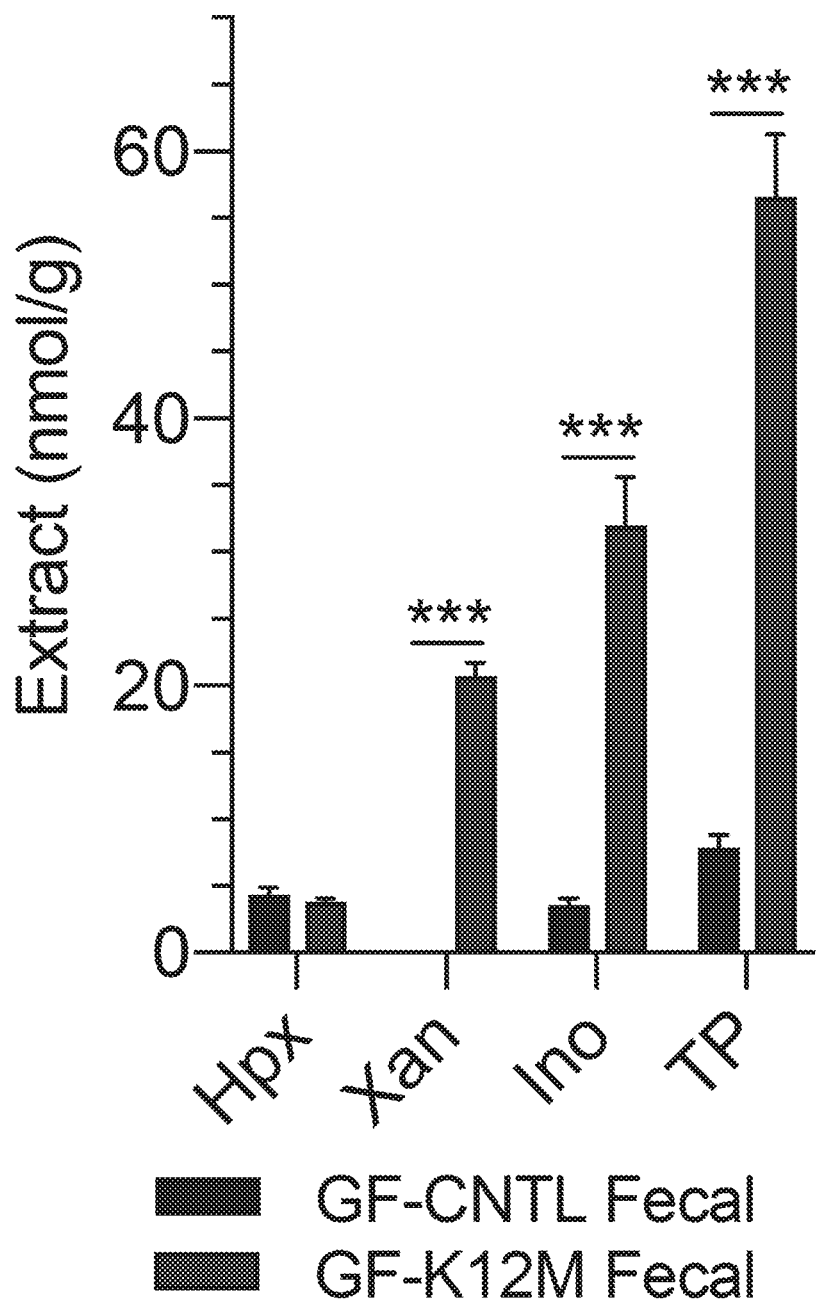
FIGS. 7A, 7B, and 7C show the results of HPLC analysis of adenylate purine content of murine fecal and colon extracts.
Figure 7B:
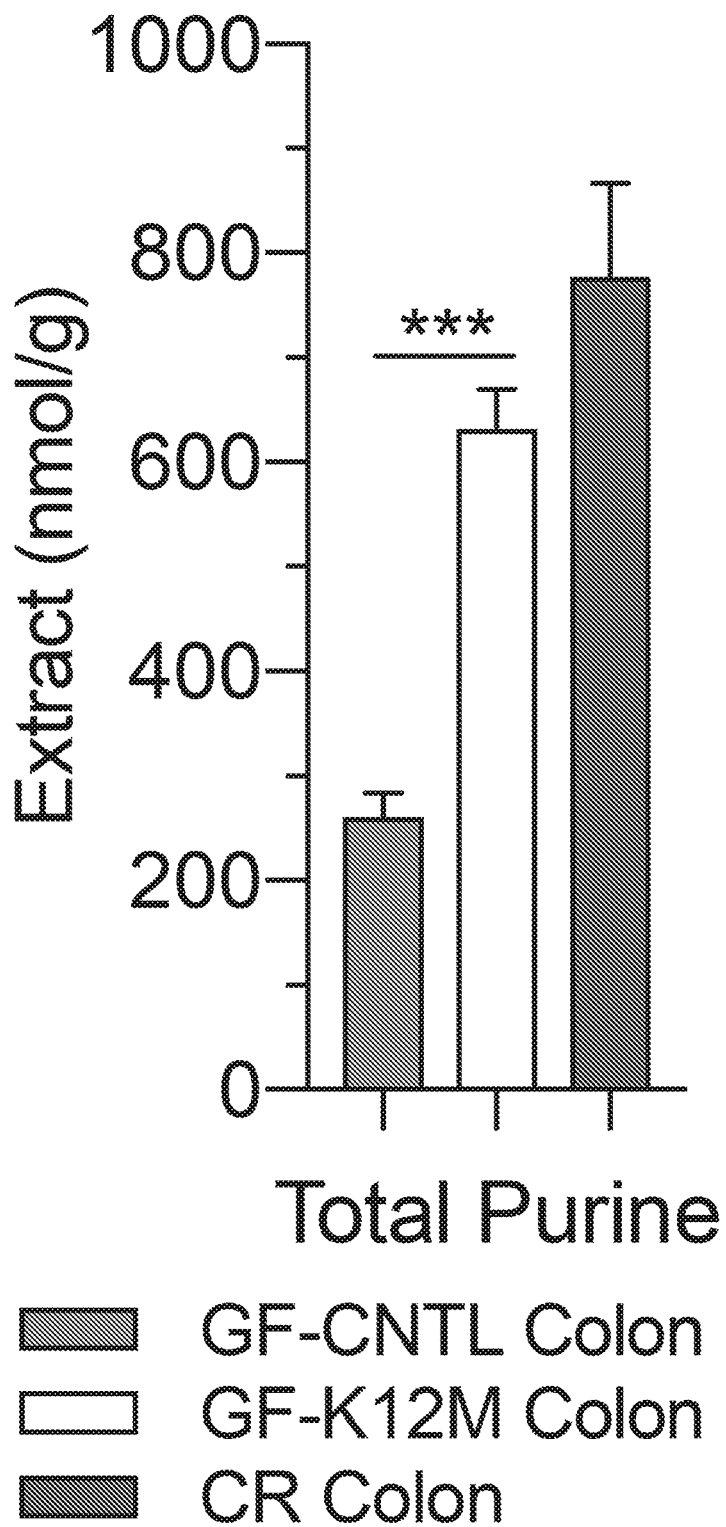
Figure 7C:
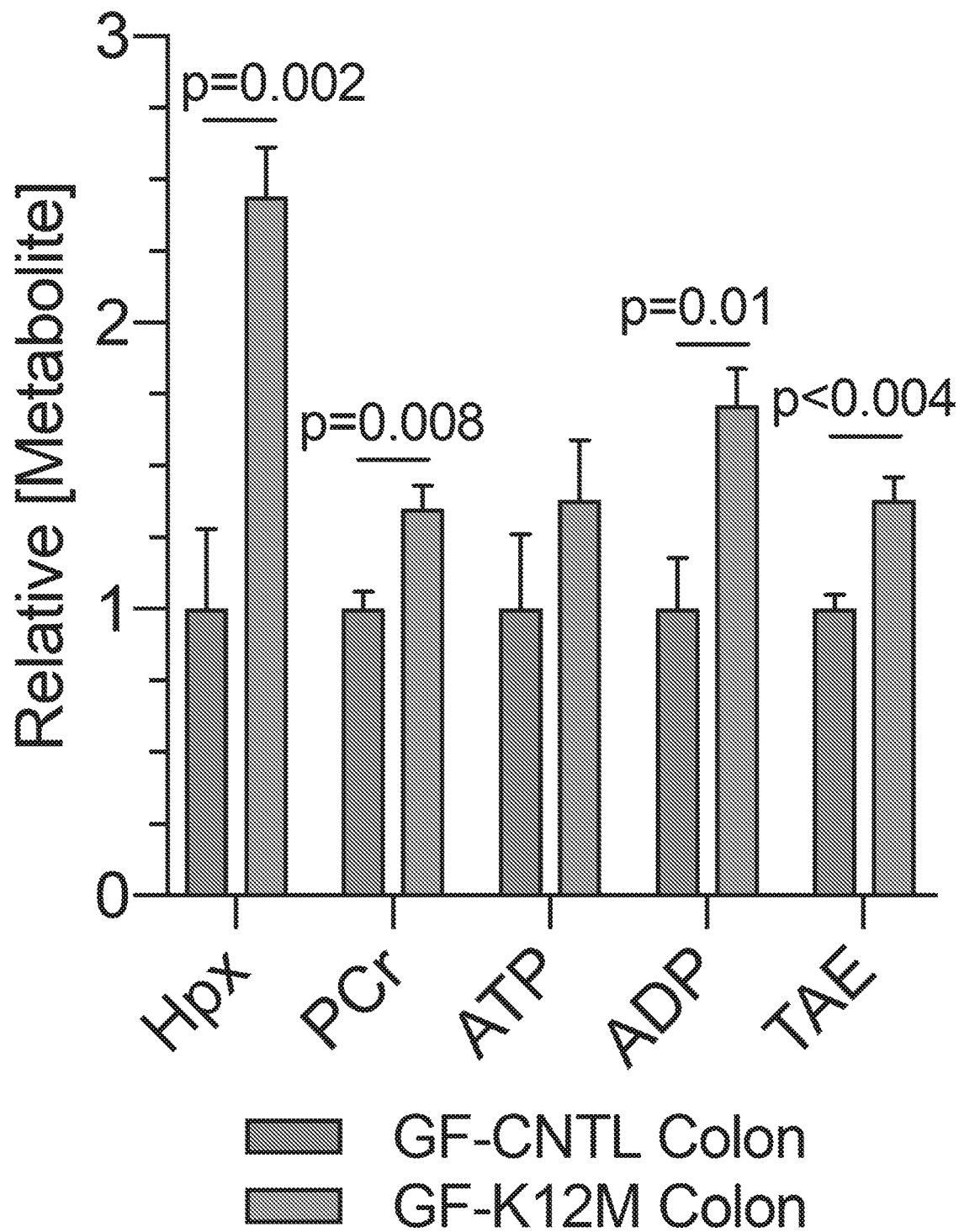

The genetically-modified E. coli (K12M) produce elevated fecal amounts of xanthine (Xan) and inosine (Ino) in the monocolonized germ-free mice (FIG. 7A). These K12M-derived purines incorporated into the colonic purine pool, notably increasing the total purine (TP) levels to the level observed in conventionally-raised (CR) mice (FIG. 7B). The purines were utilized by the intestinal mucosa to elevate colonic hypoxanthine, phosphocreatine, adenosine diphosphate, adenosine triphosphate, and thus the total available energy (FIG. 7C). Not shown but also elevated are colonic xanthine, inosine, uric acid, and adenosine monophosphate. These data demonstrate that genetically modified microbes can successfully colonize the colon and deliver substantial levels of supplementation with any purine, which increases cellular hypoxanthine levels due to the metabolic pathways by which cells salvage purines for nucleotide production.

Figure 8A:
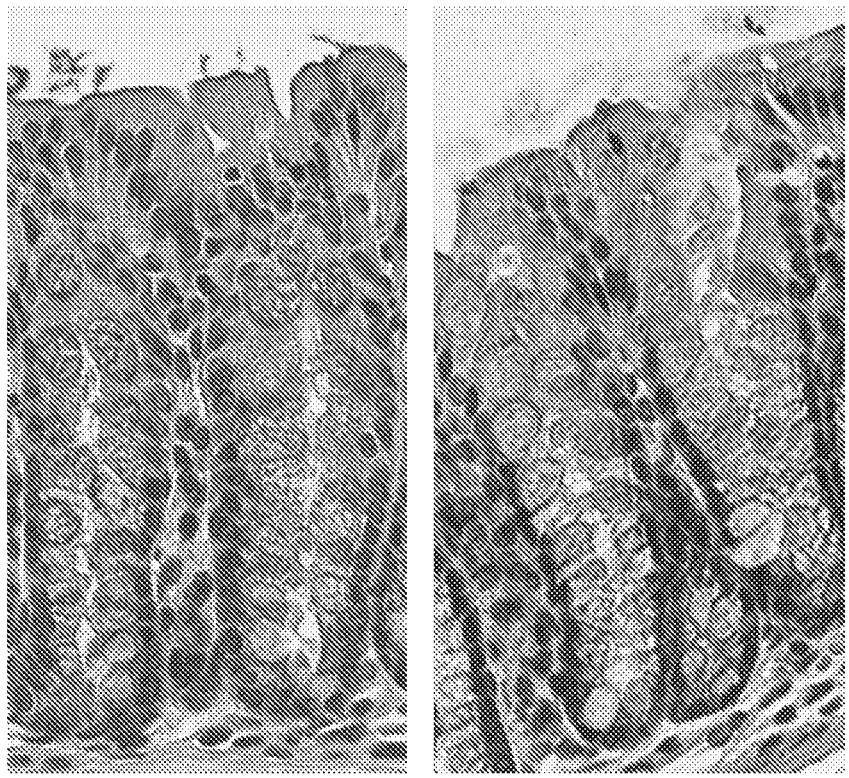
FIGS. 8A, 8B, and 8C show colon tissue analyses of uncolonized and monocolonized with K12M germ-free mice.
Figure 8B:
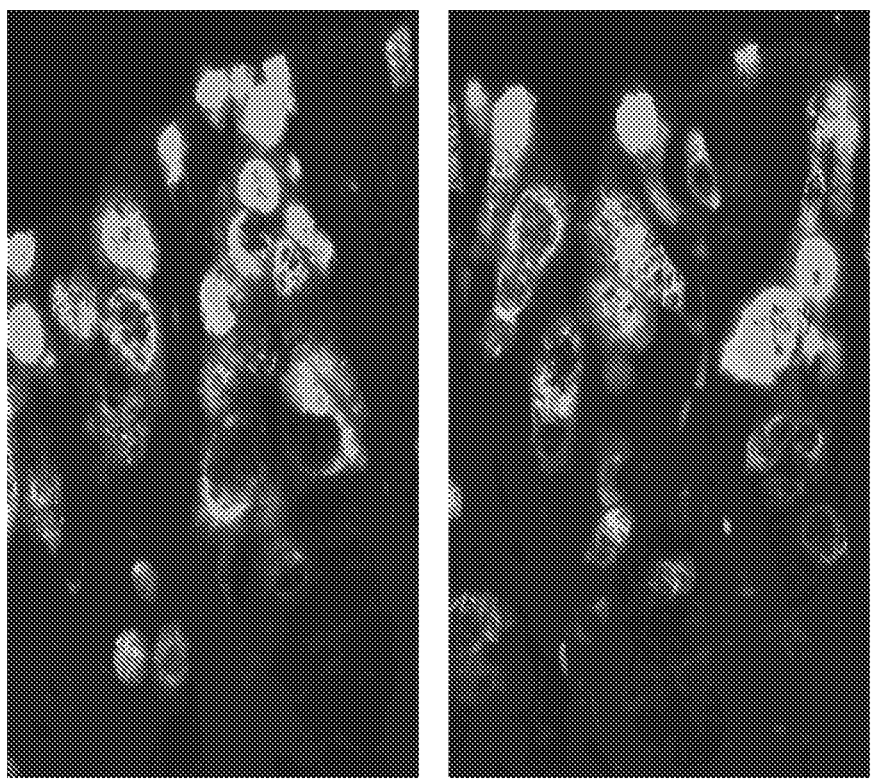

Additionally, monocolonization with the genetically-modified E. coli promoted colonic goblet cell secretory function and enterocyte intestinal alkaline phosphatase production. One way in which goblet cells contribute to intestinal barrier function is through the secretion of mucin. In the colon, these mucins cover the epithelium with a dense, inner mucus layer to establish a boundary that limits epithelial contact with luminal microbes, and an outer, less-dense layer that provides habitat and fuel for commensal bacteria. Goblet cells (GCs) do not secrete their thecal content unless properly stimulated by microbiota. Colonic hematoxylin and eosin (H&E) staining of uncolonized germ-free mice (GF-CNTL) colon tissue show GCs that generally maintain their globular structure and retain their thecal content along the entirety of the crypt, while most GCs in the mutant E. coli monocolonized germ-free mice (GF-K12M) expel their contents before reaching the mucosal/lumen interface (MLI) (FIG. 8A). This K12M-induced secretory function is also demonstrated through immunofluorescent (IF) analyses for intestinal trefoil factor (ITF; Abcam ab231546)—the ITF in GF-CNTL is constrained to the goblet cell theca, whereas the ITF in GF-K12M is secreted and distributed across the MLI (FIG. 8B). This secretion of ITF is necessary for intestinal homeostasis, as ITF protects the mucosa from a variety of insults and is critical for epithelial restitution after wounding.

Figure 8C:
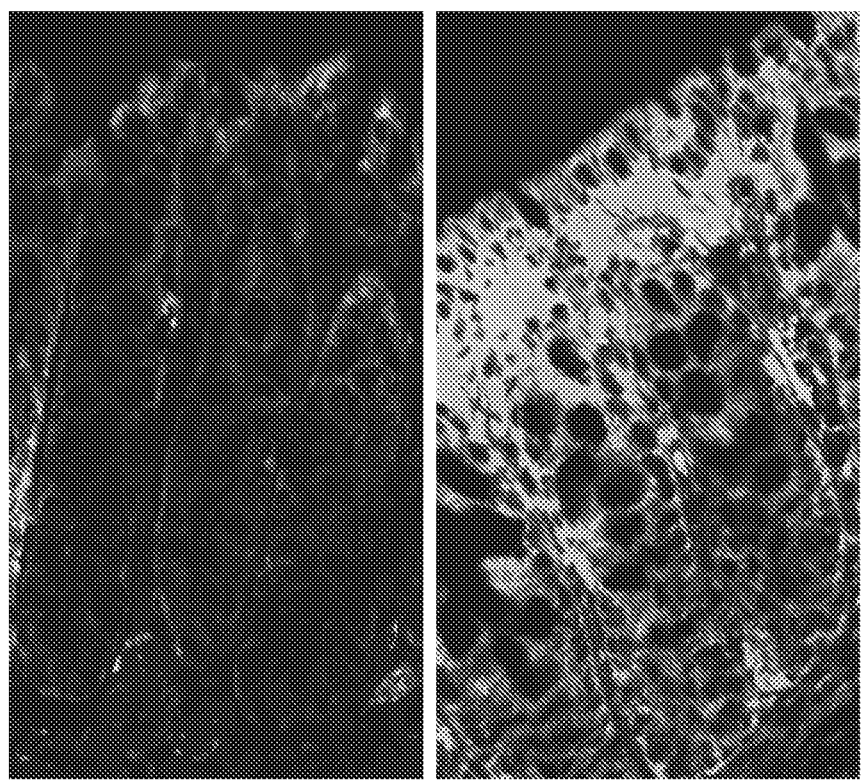

Intestinal alkaline phosphatase (ALPI) is an enzyme produced and secreted by colonic enterocytes. ALPI is a key regulator of intestinal inflammation, infection, and microbial balance through the dephosphorylation and resulting detoxification of lipopolysaccharide (LPS). Without detoxification, LPS plays a critical role in inflammatory bowel disease (IBD) pathogenesis. ALPI production is drastically induced by K12M colonization, as observed by immunofluorescence (FIG. 8C; Abcam ab108337). Production and secretion of mucus, ITF, and ALPI is energetically costly to the host, but the energetic benefit provided by purine enriched microbiota may offset this expenditure.

Example 7

Figure 9A:
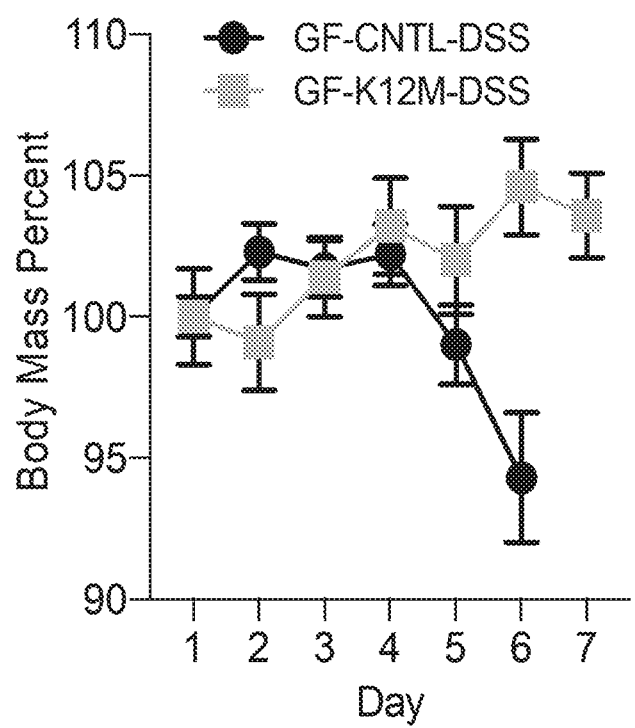
FIGS. 9A, 9B, 9C, and 9D show analyses of uncolonized and monocolonized with K12M germ-free mice submitted to DSS-colitis (GF-CNTL-DSS and GF-K12M-DSS, respectively).
Figure 9B:
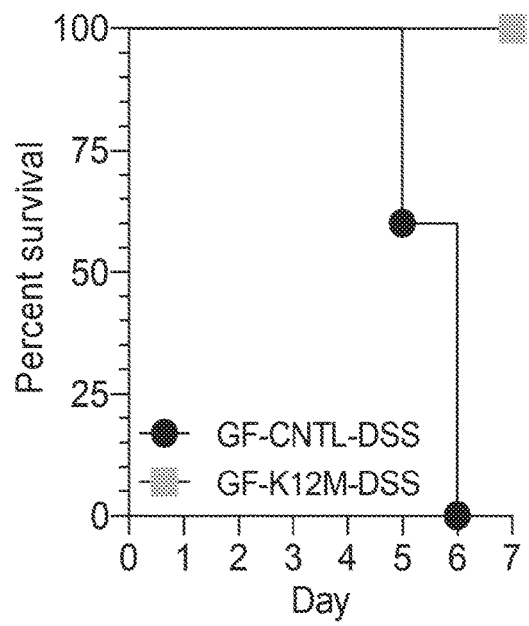
Figure 9C:
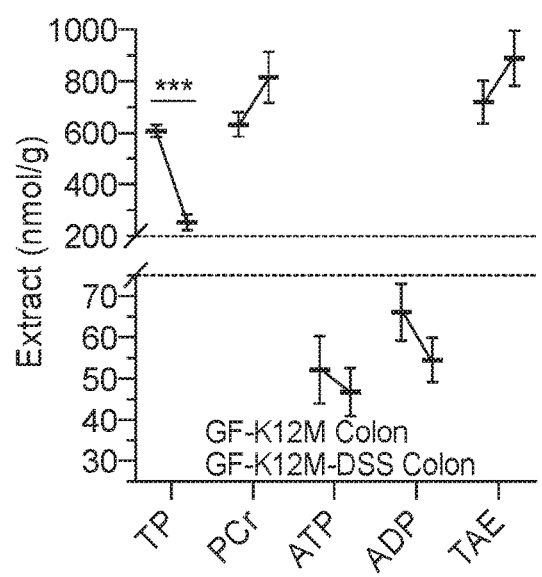
Figure 9D:
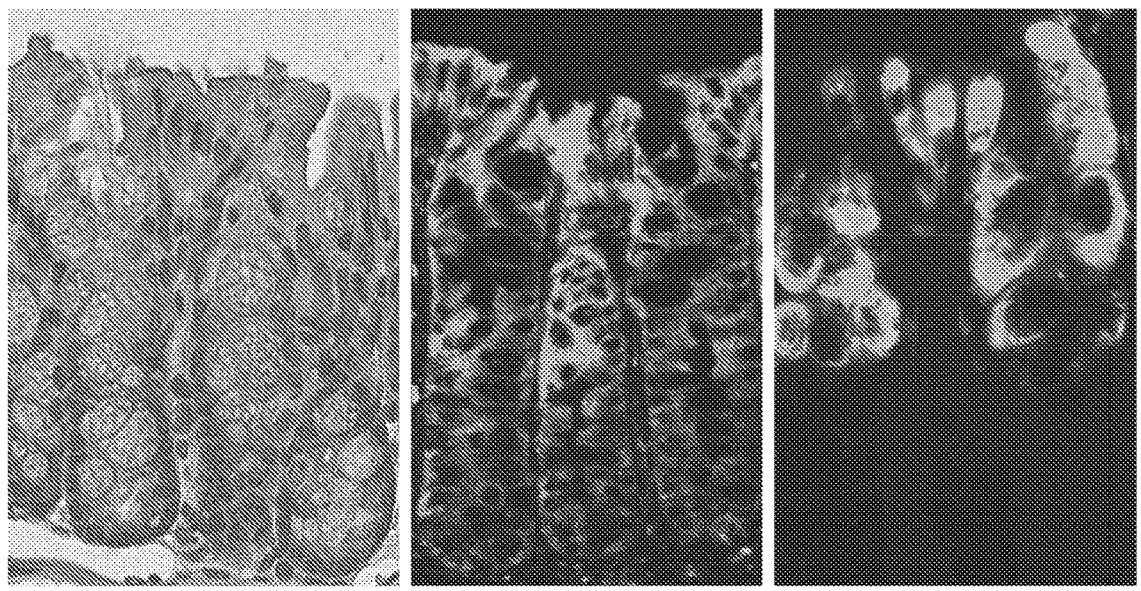

Genetically Engineered E. coli Protect Against Dextran Sodium Sulfate (DSS)-Induced Colitis GF-CNTL and GF-K12M mice were submitted to DSS-induced colitis (3% DSS, 5 days; GF-CNTL-DSS, GF-K12M-DSS). K12M colonization protected the mice from the insult entirely, with the colonized mice showing little to no signs of sickness while uncolonized mice succumbed (FIGS. 9A and 9B). Purine content analyses of the mouse colon tissues of K12M monocolonized mice before and after the chemical insult show that the tissue submitted to DSS employed the microbial-derived purines to maintain the total available energy (TAE, FIG. 9C). Additionally, visualization of GF-K12M-DSS colon tissue by H&E showed maintenance of the colonic crypt architecture and goblet cell secretion, with immunofluorescent analyses showing continued ALPI and ITF production and distribution (FIG. 9D).

Example 8

Intestinal Microbiota Produce and Secrete Purines at High Levels

Analyses of soluble, extracellular murine fecal metabolite extracts by HPLC identified substantial levels of available purine (~550 nmol/g), primarily as hypoxanthine (Hpx, ~350 nmol/g). The production of purines by the microbiota was verified by fecal extract analyses of streptomycin-treated mice, which decreased the available fecal purine more than 80%, lowering available Hpx to <50 nmol/g. Additional fecal analyses in germ-free (GF) mice showed little available purine (Hpx, <5 nmol/g, FIG. 10A).

Example 9

The Colonic Mucosa Salvages Supplemented Purine for Nucleotide Genesis

To assess the influence of purine supplementation on colonic adenylate and energy metabolism, MDP was depleted by treating mice with streptomycin, and reconstituted by administration of Hpx (1 mM) by enema at time points of 5 and 18 h before sacrifice and distal colon tissue metabolite extracts analyzed. The supplemented Hpx was incorporated into the colonic adenine nucleotide pool, increasing AMP (58 to 84 nmol/g, $p=0.02$) and ADP (80 to 123 nmol/g, $p<0.02$), while decreasing ATP (192 to 154 nmol/g, $p<0.02$; FIG. 10B), together elevating the total colonic purine from 490 to 560 nmol/g ($p<0.03$; FIG. 10C). The adenylate metabolite shifts were accompanied by a substantial phosphocreatine decrease (3700 to 2000 nmol/g, $p<0.05$; PCr; FIG. 10D).

Example 10

Purine Producing Bacteria Protect Against DSS-Induced Colitis

Figure 10F:
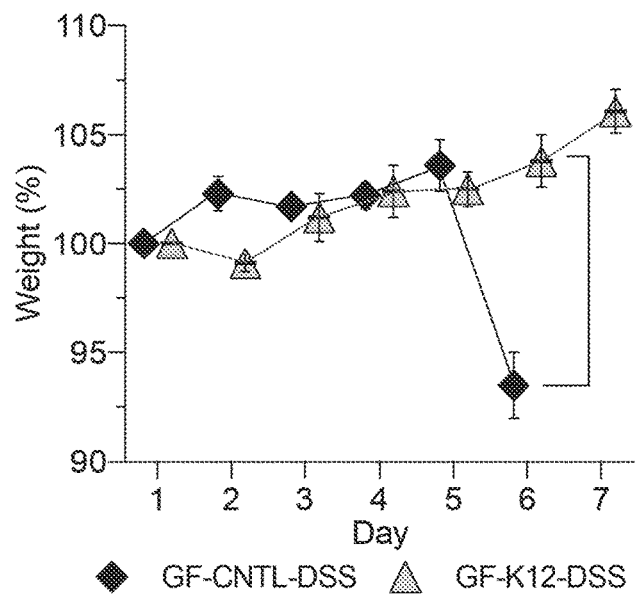
Figure 10G:
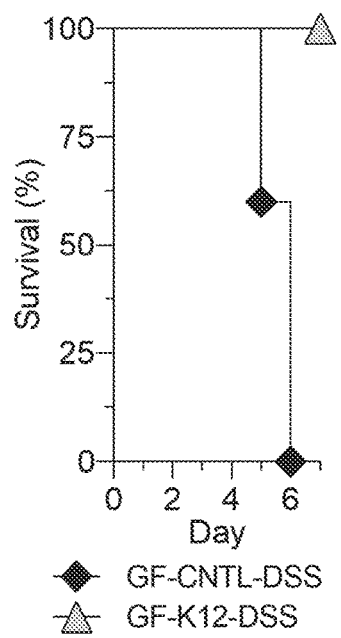
Figure 10H:
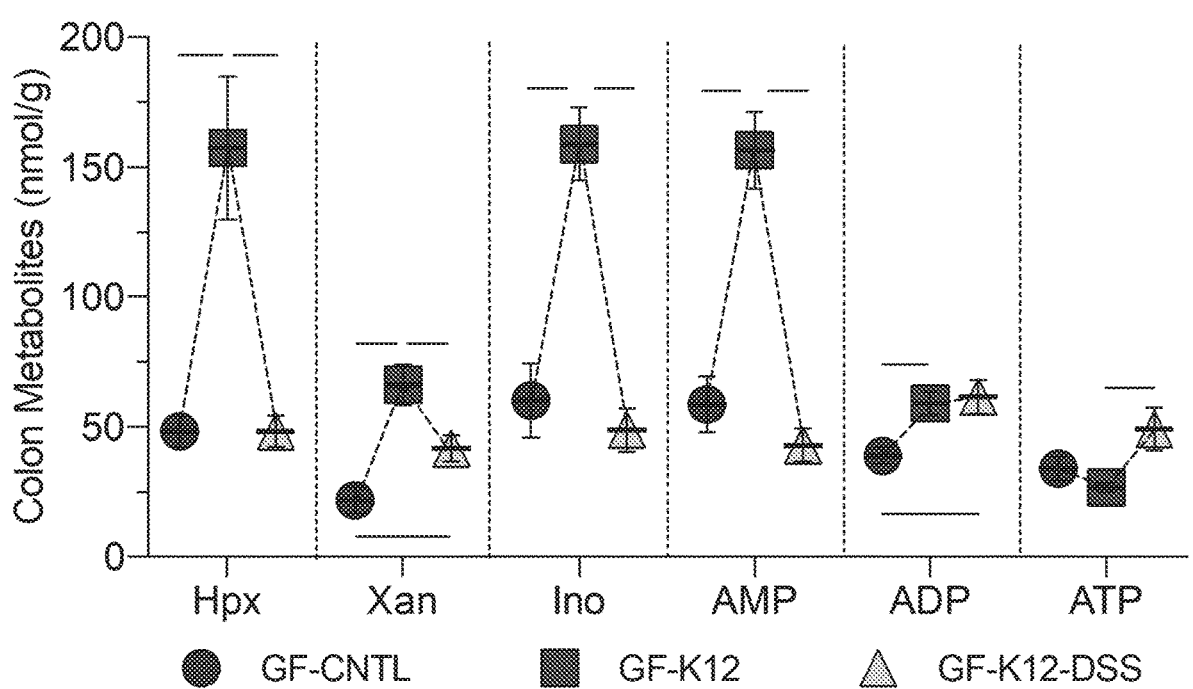

To assess the contribution of microbiota-derived purine (MDP) on colonic metabolism and function, germ-free mice (GF-CNTL) were colonized with *E. coli* K12 (GF-K12). Apparent available fecal purine was then determined, identifying K12 production of xanthine (undetected to 14 nmol/g, $p<0.001$; Xan) and inosine (3.6 to 28 nmol/g, $p<0.001$; Ino), raising the total apparent available fecal purine from 8.0 to 46 nmol/g (FIG. 10E). The GF-CNTL and GF-K12 mice were subjected to DSS-induced colitis, throughout which the colonized mice showed no signs of sickness while the uncolonized mice succumbed (FIGS. 10F and 10G). Despite K12 providing roughly a tenth of the available purine provided by commensals in conventionally-raised (CR) mice, GF-K12 mice showed significant increases in colon tissue Hpx (48 to 160 nmol/g, $p<0.005$), Xan (22 to 66 nmol/g, $p<0.002$) Ino (60 to 159 nmol/g, $p=0.001$), AMP (59 to 157 nmol/g, $p<0.001$), and ADP (39 to 59 nmol/g, $p<0.006$), raising the total purine from 260 nmol/g to 620 nmol/g ($p<0.001$), elevating the tissue purine level comparable to that seen in CR mice (~730 nmol/g). Additionally, GF-K12 mice showed a corresponding colonization-induced PCr decrease from 470 to 250 nmol/g ($p<0.001$). Although the purines supplied to the colon from K12 colonization were in the form of Xan and Ino instead of the Hpx observed in CR mice, the Hpx increase in the colon tissue of GF-K12 is indicative of available Ino, and perhaps Xan, incorporation into the adenylate nucleotide pool through the purine salvage pathway. This observation agrees with analyses in which T84 IECs were treated with 100 μM and ADP and 1 mM adenosine, resulting in an ~15 and over 150-fold Hpx increase, respectively. Altogether, the colonization of GF mice with purine-producing bacteria generally recapitulate the metabolic shifts observed in the CR purine depletion and Hpx enema reconstitution model in that the luminal supply of purine is incorporated into the colonic tissue, and as manifested by increased PCr consumption, appears to drive metabolic flux through ATP. Colon tissue metabolite analyses of colonized mice submitted to DSS (GF-K12-DSS) show greatly reduced total purine levels (620 to 290 nmol/g, $p<0.001$) but maintenance of ADP, with elevated ATP (27 to 50 nmol/g, $p<0.05$) and PCr (953 nmol/g, $p<0.001$), as though the colon relied on MDP-sourced adenylate metabolites to maintain di- and triphosphate adenylate nucleotide levels during insult (FIGS. 10H and 10I). The DSS-induced depletion of the adenylate metabolite pool associates with a PCr increase (FIG. 10J)

Figure 11A:
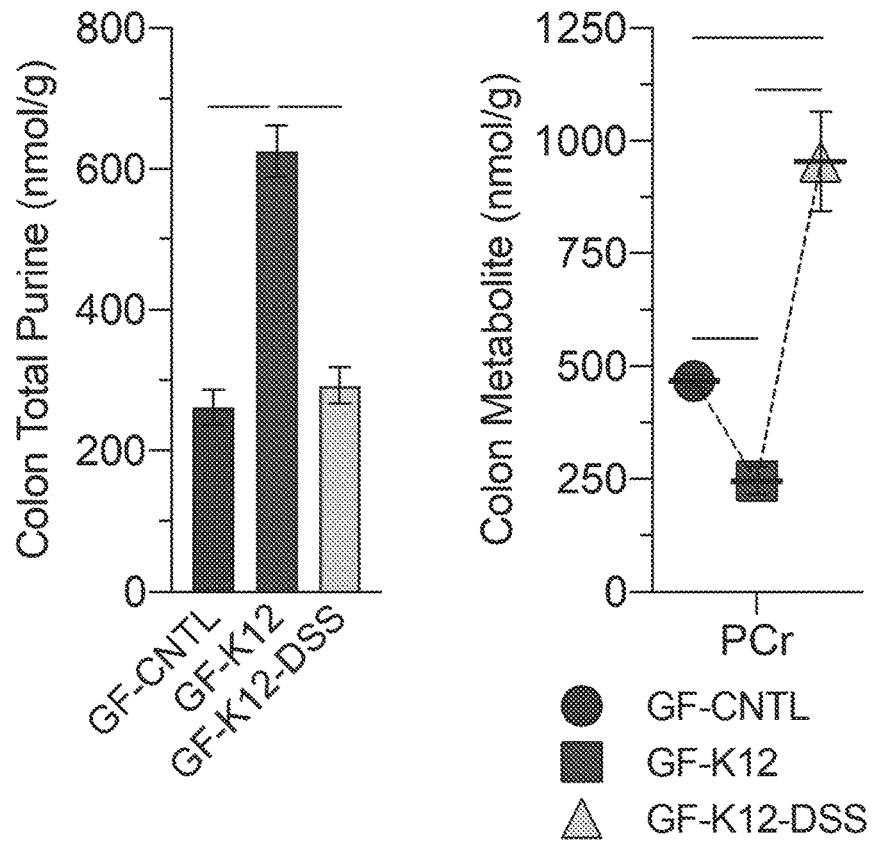
FIGS. 11A, 11B, 11C and 11D shows comparisons of conventionally-raised mice (CR-CNTL), streptomycin treated conventionally-raised mice (S-CR-CNTL), and streptomycin treated conventionally-raised mice colonized with E. coli K12 (S-CR-K12), as well as those mice subjected to DSS-induced colitis (CR-CNTL-DSS, S-CR-CNTL-DSS and S-CR-K12-DSS).
Figure 11A:
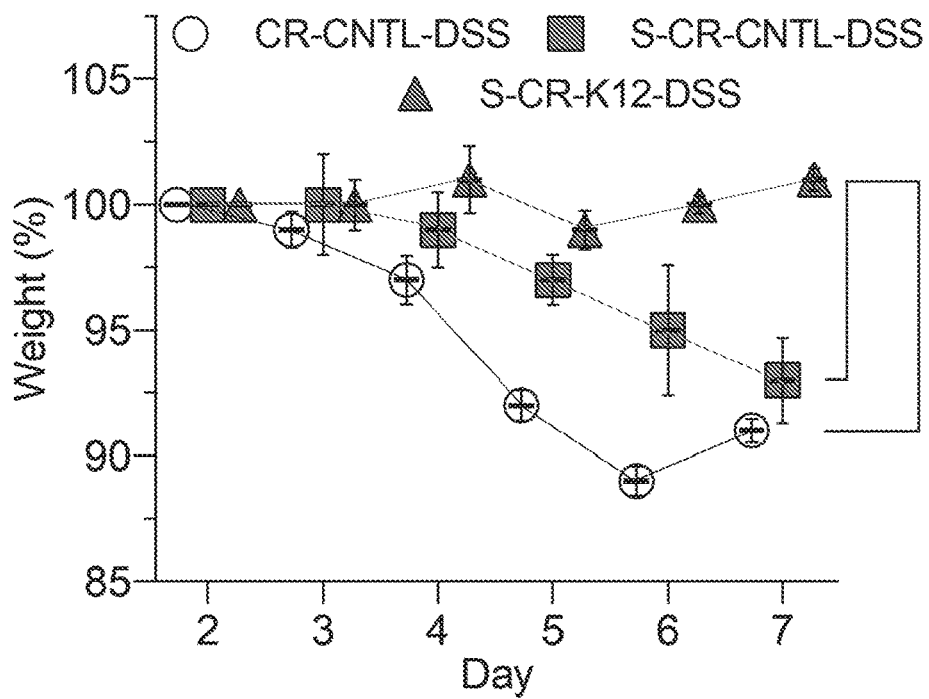
Figure 11B:
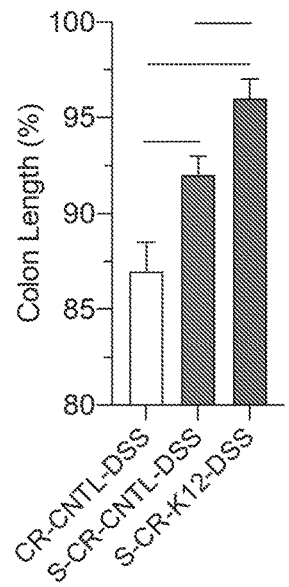
Figure 11C:
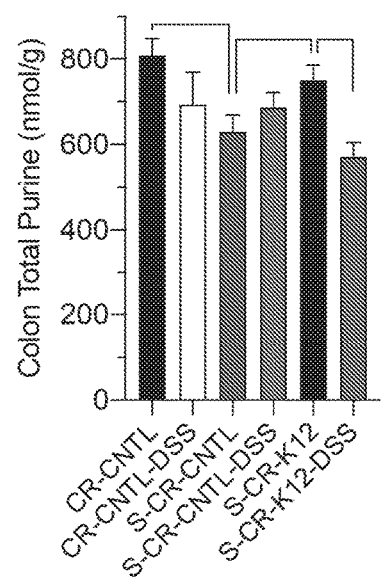
Figure 11D:
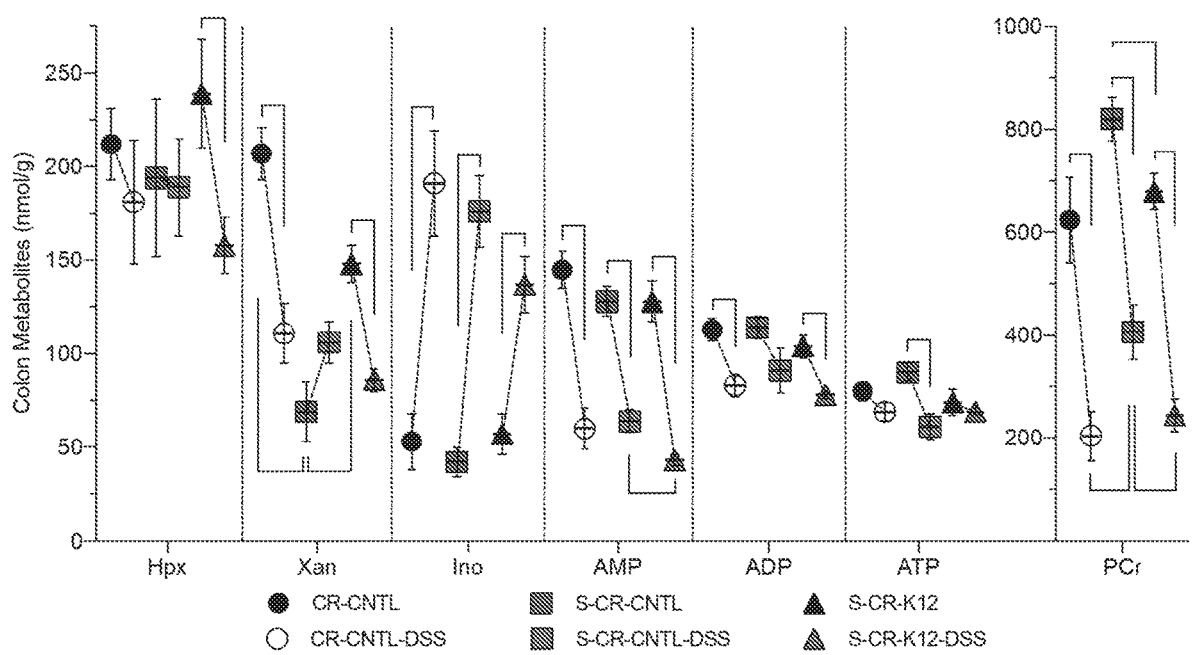

Given the protection from DSS observed in the colonized GF mice, analyses were extended into a CR mouse model. Bacterial supply of purine was depleted in CR mice (CR-CNTL) via streptomycin treatment (S-CR-CNTL), and reconstituted by colonization with streptomycin-resistant K12 (S-CR-K12). In agreement with the GF model, the K12-colonized CR mice were protected from DSS, showing little to no signs of sickness (FIG. 11A). Reduction of colon length is a commonly used indicator of DSS disease severity, with the CR-CNTL showing a ~13%, S-CR-CNTL ~8% and the S-CR-K12 mice a ~4% reduction in colon lengths ($p<0.05$ between all groups; FIG. 11B). At baseline, total colonic purine levels decreased from 809 to 630 nmol/g ($p=0.01$) with streptomycin-induced MDP depletion, primarily in the form of Xan (207 to 69 nmol/g, $p<0.001$), and was recovered to 750 nmol/g ($p=0.05$) upon K12 colonization (Xan: 148 nmol/g, $p=0.003$). Total colonic purine levels remained relatively stable in the control groups upon DSS treatment, with only K12-colonized mice exhibiting a significant decrease (750 to 570 nmol/g, $p<0.008$; FIG. 11C). The CR-CNTL mice appeared to draw from their purine store to maintain ATP throughout the insult, showing reductions in colon tissue Xan (207 to 111 nmol/g, $p<0.002$), AMP (145 to 60 nmol/g, $p<0.001$), and ADP (113 to 83 nmol/g, $p<0.008$). The S-CR-K12 mice exhibited a similar response to the CR-CNTL but with a decrease in Hpx (239 to 158 nmol/g, $p<0.04$) in addition to Xan (150 to 86 nmol/g, $p<0.001$), AMP (128 to 43 nmol/g, $p<0.001$) and ADP (104 to 78 nmol/g, $p<0.004$) while maintaining ATP. In contrast, the S-CR-CNTL was comparatively lacking in purine salvage and ATP genesis capability, appearing unable to draw from the cellular Hpx, Xan, and ADP, while less efficiently utilizing AMP (128 to 88 nmol/g, $p<0.004$), rendering the tissue unable to maintain ATP (90 to 61 nmol/g, $p<0.01$). Previous in vitro work submitting IECs to hypoxia and 2-deoxyglucose treatments resulted in substantial Ino increases as well, suggesting such an increase denotes energetic stress. Interestingly, all experimental groups showed a 2.5-4-fold Ino increase ($p<0.01$) in response to the insult. Submission to DSS substantially depleted the colon tissue energy stores, decreasing PCr ~400 nmol/g ($p<0.01$) in all mouse groups. As was observed in the previous models, the MDP supplied to the CR-CNTL and S-CR-K12 groups decreased PCr ~150 nmol/g compared to S-CR-CNTL at baseline and after DSS, further alluding to purine salvage driving metabolite flux through ATP (FIG. 11D).

Example 11

Figure 12A:
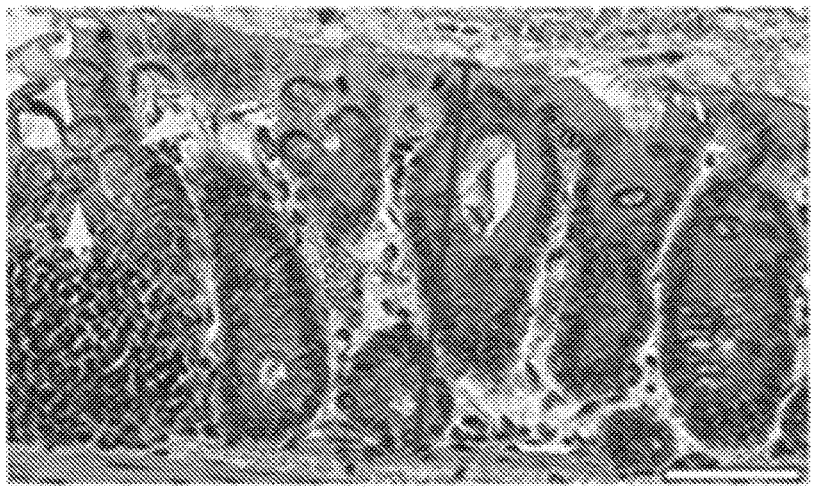
Figure 12A:
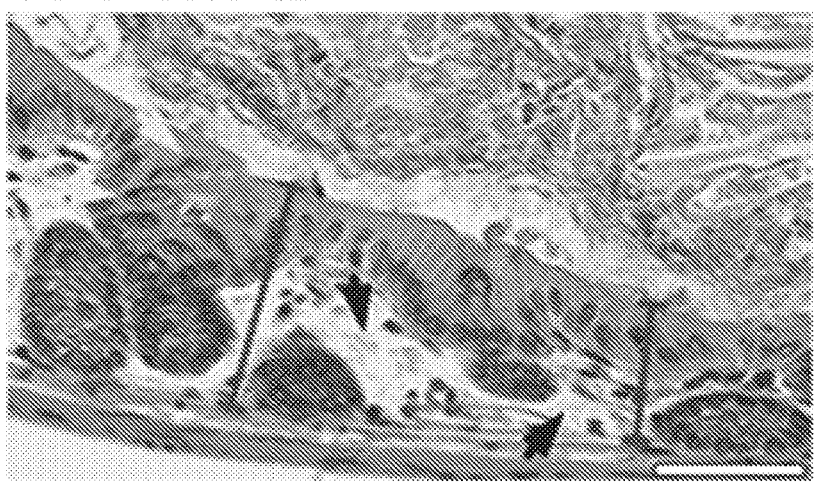
Figure 12A:
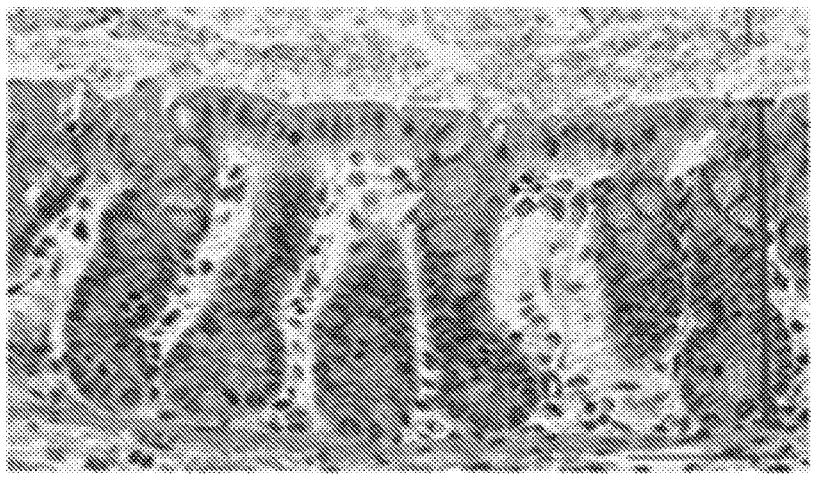

Microbiota-Derived Purines Support Energy Balance, Proliferation, and Endoplasmic Reticulum Function During Insult Visualization of the colon tissues by hematoxylin and eosin (H&E) staining in the CR mouse groups reveal two key differences between tissue with and without MDP supply. Firstly, the streptomycin control mice have shorter crypt depth with fewer epithelial cells, ensuing a thinner, less dense mucosa. Secondly, goblet cell thecal volume is noticeably attenuated, suggesting dysfunctional mucin production (FIG. 12A). These phenotypes correlate with the adenylate energy charge (AEC, $(ATP+0.5 \times ADP)/(ATP+ADP+AMP)$)—a commonly used index used to indicate cellular energy status that is defined by relative adenine nucleotide levels, providing a more functionally relevant indicator of energy balance than ATP and/or PCr alone. The CR-CNTL colon tissue submitted to DSS (CR-CNTL-DSS) shows an AEC of 0.51, with the AEC decreasing to 0.44 ($p<0.04$) upon MDP depletion by streptomycin treatment (S-CR-CNTL-DSS), and then increasing up to 0.57 ($p<0.001$) with purine reconstitution by K12 colonization (S-CR-K12-DSS; FIG. 12B). The adenylate and PCr metabolite analyses demonstrate that MDP support ATP biosynthesis during insult, with the AEC corroborating the postulate.

Figure 12D:
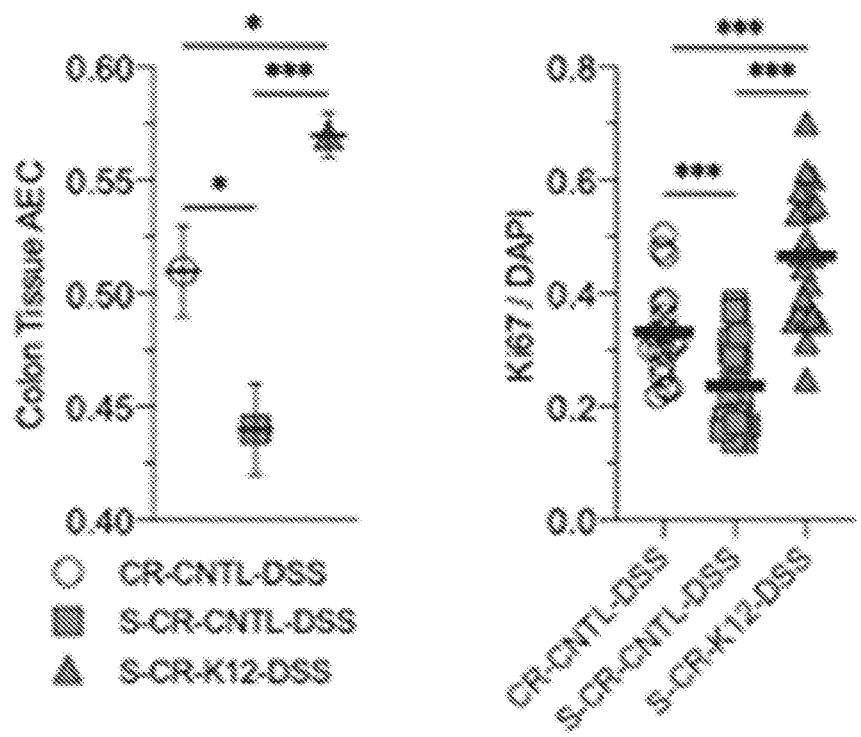
Figure 12D:
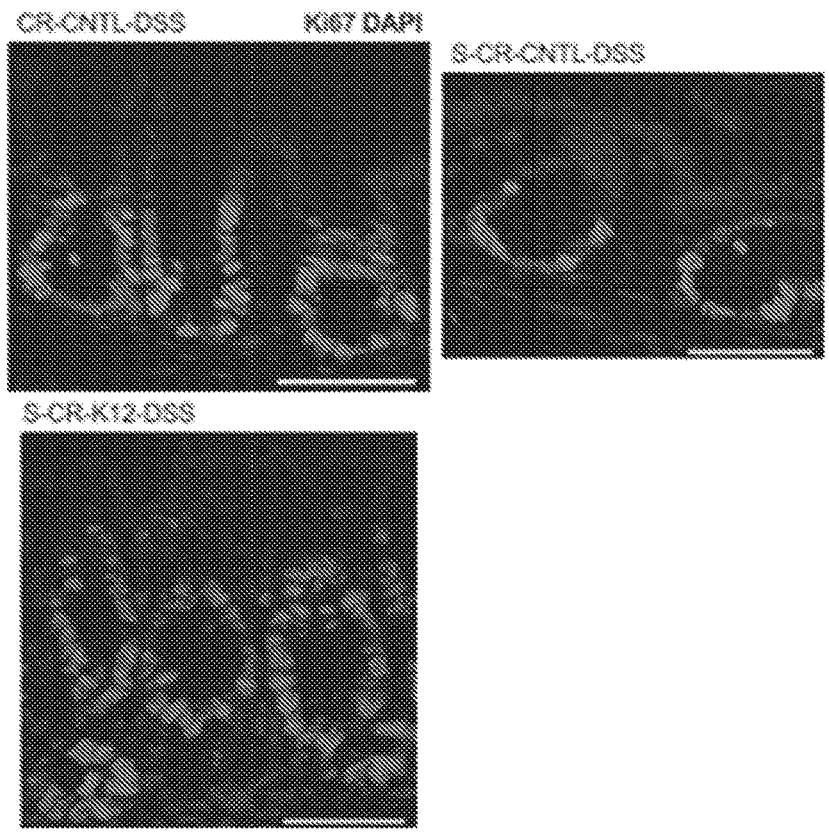

Insult to the intestinal epithelium is not only energetically depleting, requiring substantial ATP regeneration capability, but also demands considerable nucleotide genesis for proliferation to repopulate the mucosa for wound healing. Given the association between the AEC and cellular function and the metabolic data indicative of MDP promoting flux through ATP, the colon tissue analyses were extended to Ki67 as marker of proliferation. Immunofluorescent analyses of the DSS-insulted tissue revealed a substantial decrease in proliferation associated with MDP depletion (CR-CNTL-DSS: 0.33 Ki67/DAPI; S-CR-CNTL-DSS: 0.24 Ki67/DAPI, $p<0.001$). Colon tissue proliferative capacity was reclaimed with K12 colonization and MDP supply reconstitution (S-CR-K12-DSS: 0.47 Ki67/DAPI, $p<0.001$; FIGS. 12C and 12D), a result strongly correlating with the AEC and observed lack of mucosal crypt depth and cellular density in the streptomycin control mice.

Figure 13C:
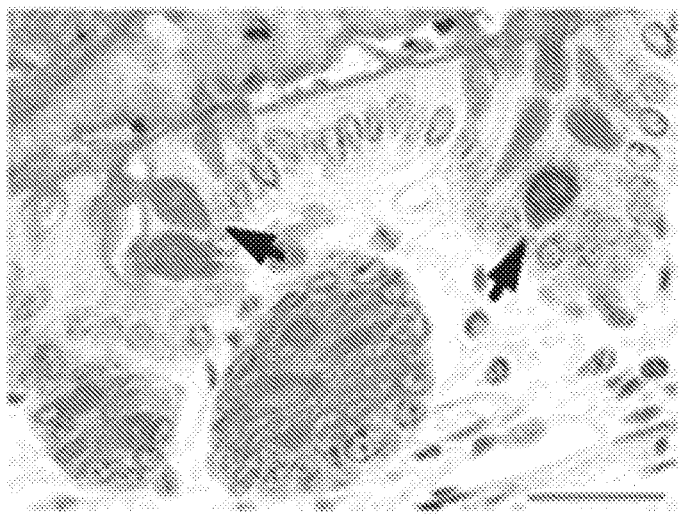
Figure 13C:
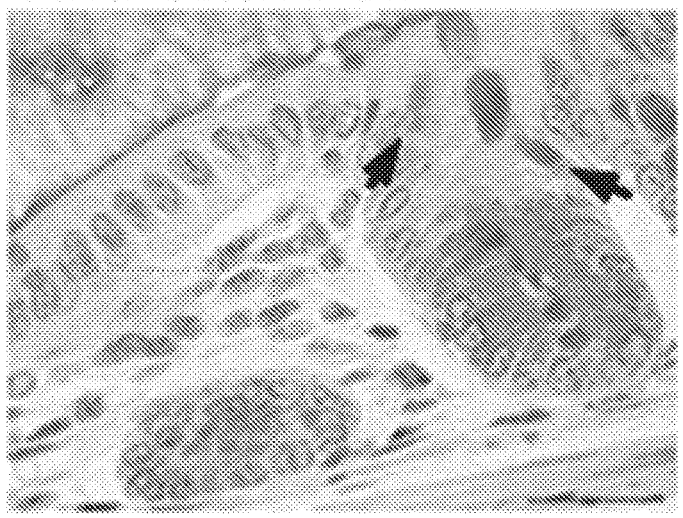
Figure 13C:
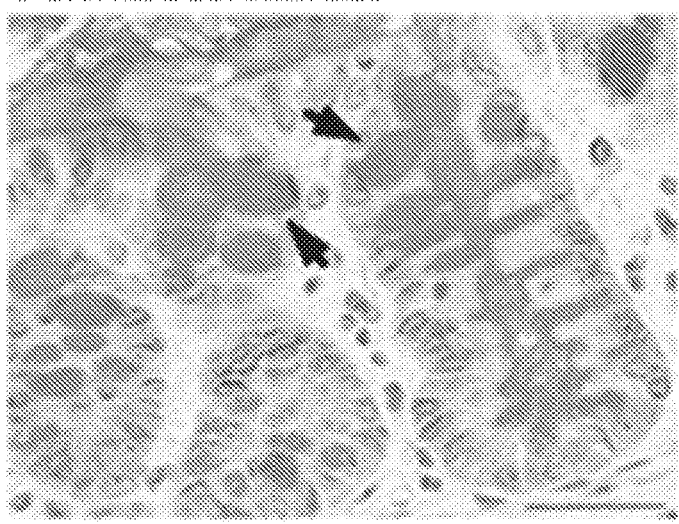

The endoplasmic reticulum (ER) is notably reliant on and demanding of ATP to execute protein-related functions. Without sufficient ATP, misfolded proteins accumulate, dock to binding immunoglobulin protein (BiP), and then induce a signal transduction pathway called the unfolded protein response (UPR). As the ATP-dependent BiP also functions to block ER stress signaling, assist protein folding, and protect against misfolded protein toxicity, BiP expression is upregulated by the UPR. Due to the importance of ATP supply for ER function, the colon tissue immunofluorescent analyses were extended to BiP as a marker of ER stress and the UPR. BiP protein was indeed elevated by MDP depletion, rising from 0.33 BiP/DAPI in the CR-CNTL-DSS mice to 0.44 BiP/DAPI in the S-CR-CNTL-DSS group. The induction of BiP was attenuated by K12 MDP reconstitution, restoring BiP levels to 0.34 BiP/DAPI in the S-CR-K12-DSS mice (FIGS. 13A and 13B).

Example 12

Figure 13F:
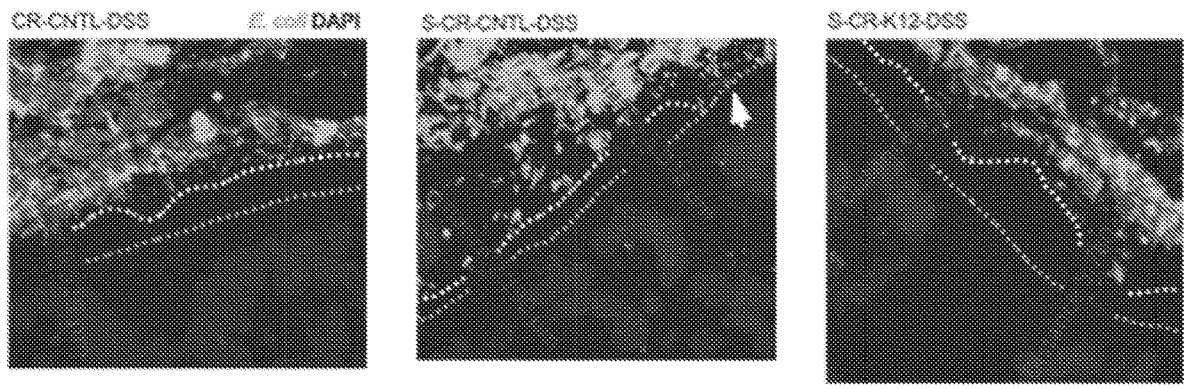

The Sterile Integrity of the Colonic Inner Mucin Layer is Dependent on Microbiota-Derived Purine Supply During Insult Goblet cells require robust ER function for mucin protein folding and dimerization, prompting analyses of the impact of MDP on colonic mucin production and secretion. To observe mucin production tissue sections were stained with alcian blue. Mucin staining also revealed a broad decline in the goblet cell thecal volumes as a consequence of streptomycin treatment, which was recovered by restoring MDP supply (S-CR-K12-DSS; FIG. 4C). To assess inner mucin layer sterile integrity, immunofluorescent analyses targeting *E. coli* were performed and utilized to estimate permeability of the mucus barrier to the gut microbiota. The average length of the sterile mucus layer in the CR-CNTL-DSS mice was found to be ~7 μm, which decreased to ~2 μm ($p=0.008$) with MDP removal (S-CR-CNTL-DSS). Reconstitution of purine supply (S-CR-K12-DSS) salvaged mucus barrier sterility, increasing the length to ~5 μm ($p<0.03$). An additional metric termed the sterility index was utilized to assess the integrity of the mucus barrier. In the images used to quantitate the length of the inner mucin layer, if no *E. coli* was observed contacting the epithelium a score of 1 was given, whereas if contact between *E. coli* and the epithelium was observed at any point a score of 0 was given. The average of the scores was used to define the sterility index. MDP supply also correlated with the sterility index, with CR-CNTL-DSS and S-CR-K12-DSS mice scoring ~0.5, as opposed to the mice with MDP depletion scoring ~0.1 ($p<0.02$ and $p=0.04$, respectively; FIGS. 13D-13F).

Example 13

Figure 14A:
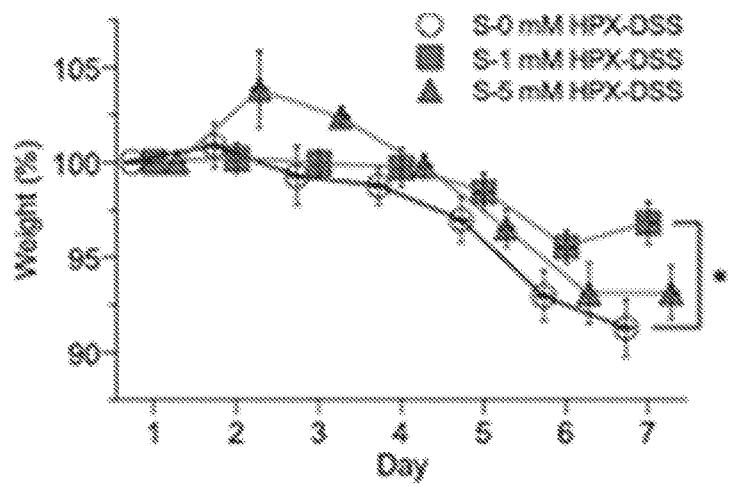
FIGS. 14A, 14B, 14C, and 14D compare the effect of supplementation of hypoxanthine (HPX) on streptomycin-treated mice subjected to DSS-induced colitis with 1 mM HPX (S-1 mM HPX-DSS), 5 mM HPX (S-5 mM HPX-DSS) or no supplementation control (S-0 mM HPX-DSS).

Hypoxanthine Supplementation in MDP-Depleted Mice Recapitulates Benefits of K12 Colonization To validate the role of exogenous purine supply on colonic function, streptomycin-treated mice (S-0 mM HPX-DSS) were supplemented with 1 and 5 mM Hpx (S-1 mM HPX-DSS and S-5 mM HPX-DSS) in their drinking water and submitted to DSS colitis. Mice receiving no Hpx supplementation lost ~9% of their body weight throughout the course of the experiment. Supplementation with 1 mM Hpx appeared protective, with mice losing ~3% of their body weight ($p<0.02$) while mice that received 5 mM Hpx lost ~7% (FIG. 14A). In other work mice administered 10 mM Hpx in their drinking water were found to excessively urinate, indicating that weight may be influenced by the supplementation and is likely not a reliable indicator of disease severity in the case of the S-5 mM HPX-DSS group. The S-0 mM HPX-DSS group showed colon lengths of ~5.75 cm, while supplementation appeared protective, exhibiting lengths of ~6.3 ($p=0.03$) and ~6.5 cm ($p<0.002$) in the mice administered 1 and 5 mM Hpx, respectively (FIG. 14B).

Figures 14B, 14C:
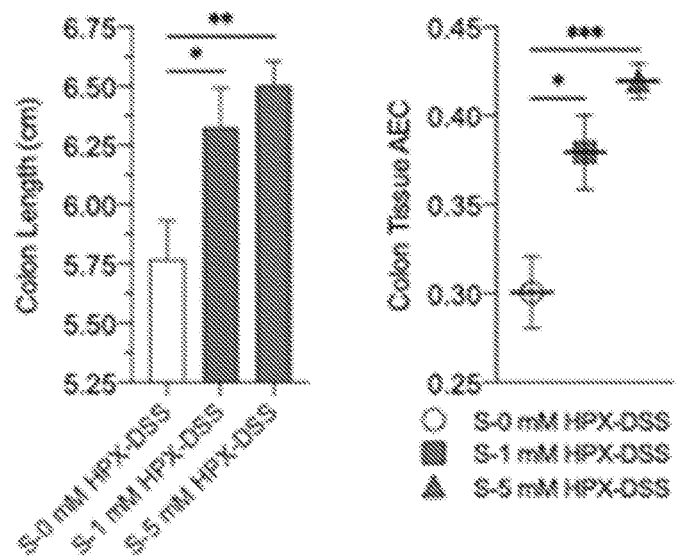
Figure 14D:
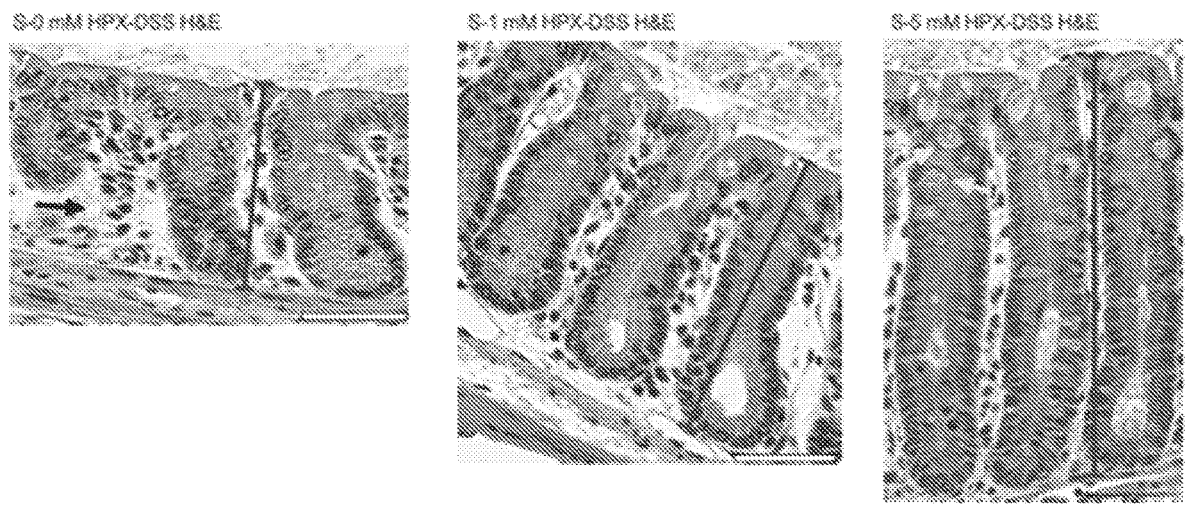
Figures 15A, 15C:
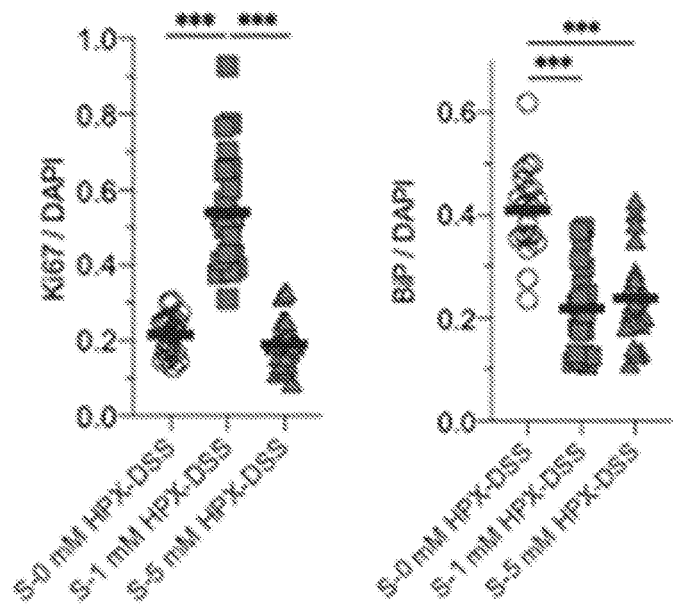
FIGS. 15A, 15B, 15C, and 15D compare the effect of supplementation of hypoxanthine (HPX) on streptomycin-treated mice subjected to DSS-induced colitis with 1 mM HPX (S-1 mM HPX-DSS), 5 mM HPX (S-5 mM HPX-DSS) or no supplementation control (S-0 mM HPX-DSS).
Figure 15B:
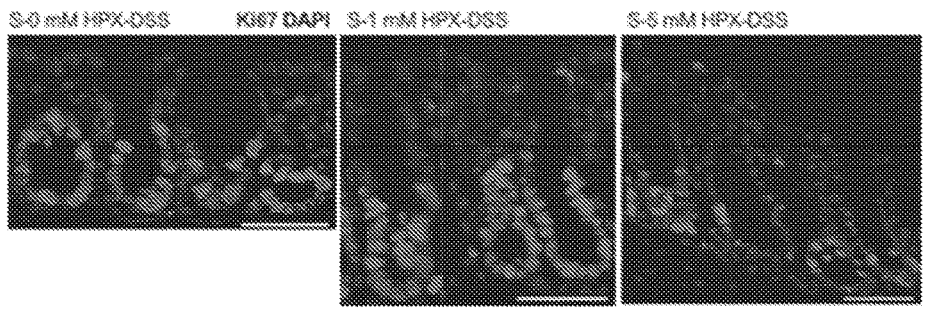
Figure 15D:
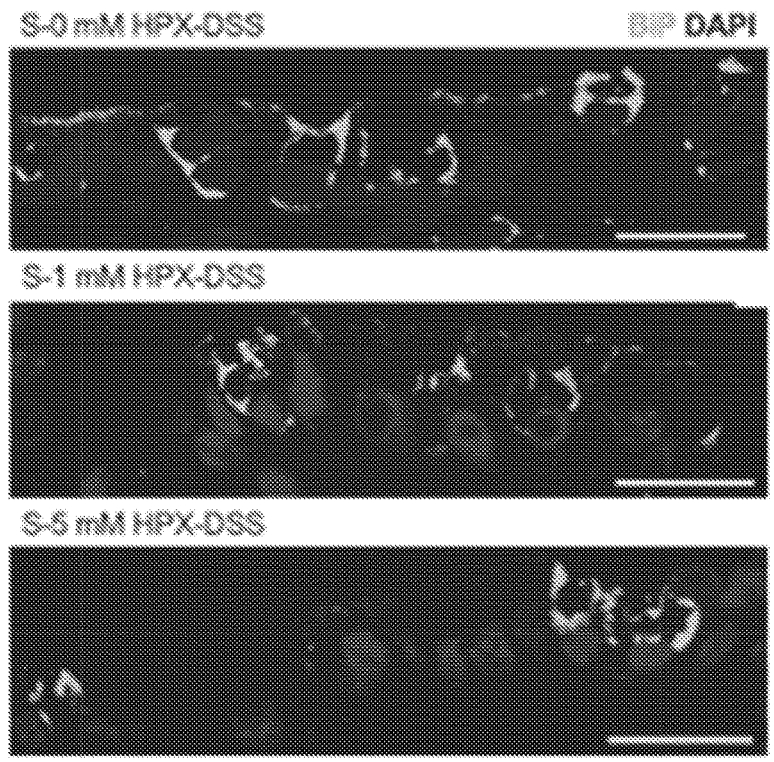
Figure 16A:
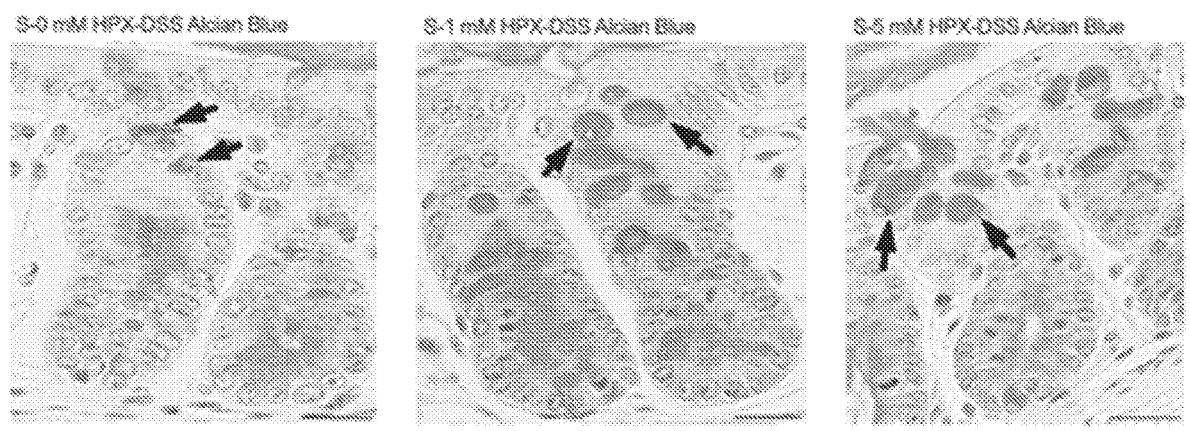
FIGS. 16A, 16B, 16C, and 16D compare the effect of supplementation of hypoxanthine (HPX) on streptomycin-treated mice subjected to DSS-induced colitis with 1 mM HPX (S-1 mM HPX-DSS), 5 mM HPX (S-5 mM HPX-DSS) or no supplementation control (S-0 mM HPX-DSS).
Figure 16B:
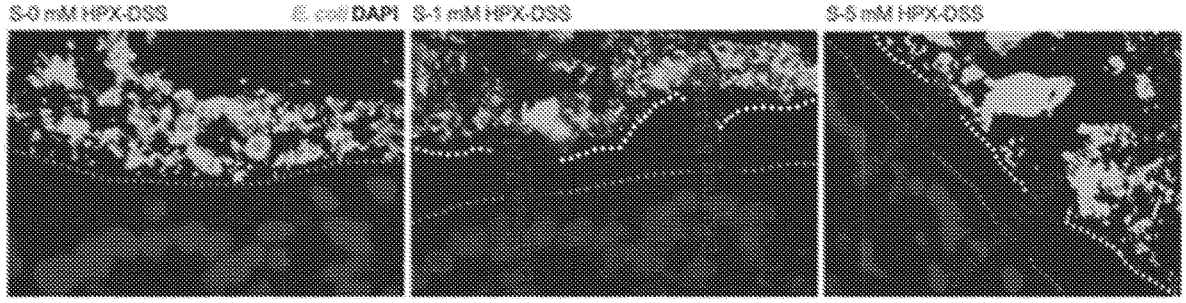
Figures 16C, 16D:
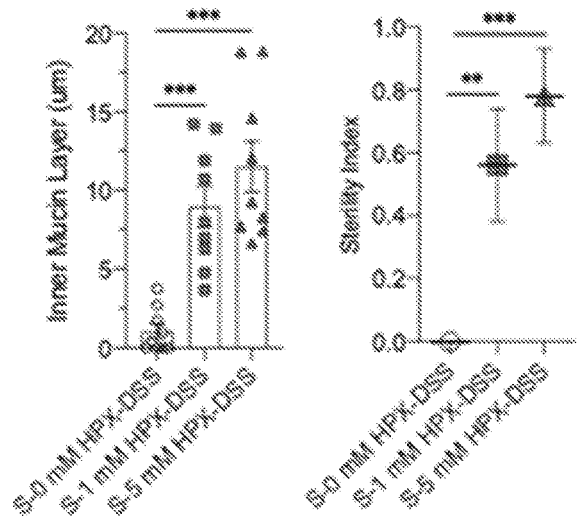
Figure 16E:
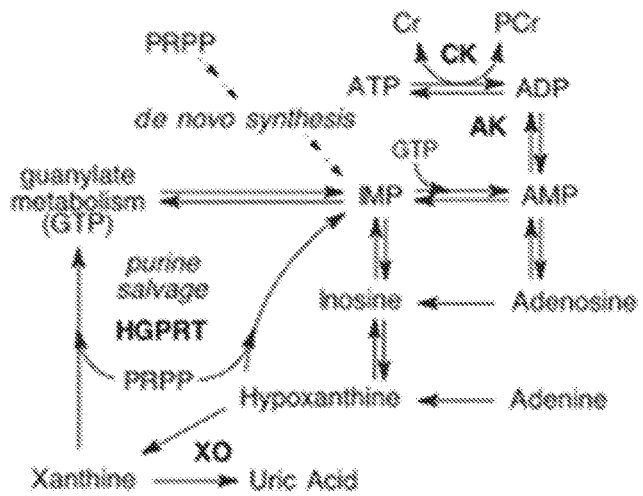
FIG. 16E illustrates the biochemical pathways of purine synthesis, including adenosine, inosine and hypoxanthine.

The protection of colon length afforded by Hpx supplementation associated with a rise in the tissue AEC, where 1 and 5 mM Hpx increased the AEC from 0.30 to 0.38 ($p=0.02$) and 0.42 ($p<0.001$), respectively (FIG. 14C). Visualization of the colon tissues by H&E staining revealed similar phenotypes as the K12-colonized mice, with streptomycin incurring a loss of epithelial cell population and lack of mucin production, both of which were recovered by Hpx supplementation (FIG. 14D). As anticipated, 1 mM Hpx increased tissue proliferation from 0.22 to 0.54 Ki67/DAPI ($p<0.001$), but surprisingly, 5 mM Hpx did not (0.19 Ki67/DAPI; FIGS. 15A and 15B). As was observed with MDP, salvage of supplied Hpx and the resulting shifts in the AEC concomitantly impacts ER stress. Supplementation of 1 and 5 mM Hpx decreased BiP from 0.41 to 0.23 ($p<0.001$) and 0.24 BiP/DAPI ($p<0.001$), respectively (FIGS. 15C and 15D). The positive influences on tissue AEC and ER stress afforded by Hpx supplementation correlated with increased goblet cell mucin production, as observed by increased thecal volumes (FIG. 16A) and increased sterile region thickness, with 1 mM Hpx supplementation increasing the sterile inner mucin layer from ~1 to 9 μm ($p<0.001$) and 5 mM Hpx to ~11 μm ($p<0.001$; FIGS. 16B and 16C). The promotion of goblet cell function by hypoxanthine was similarly apparent through an increase of the sterility index from 0 to 0.56 ($p<0.007$) and 0.78 ($p<0.001$) with 1 and 5 mM Hpx supplementation, respectively (FIG. 16D). In retrospect, given that the 5 mM Hpx supplementation protected against colon shortening while promoting deeper crypts, mucosal cell density, energy balance, ER function, and mucin secretion, it is reasonable that the supplementation did indeed promote proliferation during the insult and the mucosa was fully regenerated before the time of analysis.

The various features and processes described above may be used independently of one another or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, or step is necessary or indispensable. The novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of treating a gastrointestinal inflammatory disorder in a subject in need of such treatment, comprising administering to a microbiome of the subject an effective amount of an *E. coli* bacterial composition genetically modified to disrupt the purR, hpt, and gpt genes to overproduce at least one purine selected from the group consisting of hypoxanthine, xanthine, inosine, and adenine.

2. The method of claim 1, wherein the gastrointestinal inflammatory disorder is selected from the group consisting of Crohn's disease, ulcerative colitis, indeterminate colitis, infectious colitis, oral mucositis, gastrointestinal mucositis, nasal mucositis, proctitis, necrotizing enterocolitis, esophagitis, irritable bowel syndrome, Celiac disease, small intestinal bacterial overgrowth (SIBO), antibiotic-associated diarrhea (AAD) and *Clostridium difficile* related diarrhea.

3. The method of claim 1, wherein the microbiome is the gut microbiome.

4. The method of claim 1, wherein the microbiome is the oral microbiome.

5. The method of claim 1, wherein the microbiome is the nasal microbiome.

6. The method of claim 1, wherein the composition comprises between 1 million and 1 trillion colony forming units (CFU) per dosage unit.

7. The method of claim 1, wherein the composition further comprises a material for intestinal targeting.

8. The method of claim 7, wherein the material is insoluble in the gastrointestinal fluid at a pH of below 5 and is soluble in the intestinal fluid at a pH at or above 5.

9. The method of claim 7, wherein the material is one or more of gelatin, acrylate polymers, cellulose polymers and polyvinyl-based polymers, chitosan and its derivatives, a co-polymer of a (meth)acrylic acid and a (meth)acrylic acid $C_{1-4}$ alkyl ester, and polysaccharides.

10. The method of claim 1, wherein the composition further comprises a mucoadhesive agent.

11. The method of claim 10, wherein the mucoadhesive agent is one or more of hydrogels, thermoplastics, homopolymeres, copolymers or blends, and natural or synthetic polymers.

12. The method of claim 1, wherein the composition further comprises media that maintain or sustain viability of the bacteria in the composition.

13. The method of claim 1, wherein the method promotes repair or recovery of epithelial or mucosal lining of the gastrointestinal tract of the subject.

\* \* \* \* \*